(12) United States Patent
Takimoto et al.

(10) Patent No.: US 11,163,419 B2
(45) Date of Patent: Nov. 2, 2021

(54) INFORMATION PROCESSING APPARATUS AND INFORMATION PROCESSING METHOD FOR IMAGING DISPLAY

(71) Applicant: SONY CORPORATION, Tokyo (JP)

(72) Inventors: Yuuji Takimoto, Kanagawa (JP); Atsushi Okamori, Tokyo (JP); Hiroshi Yamaguchi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 137 days.

(21) Appl. No.: 16/154,227

(22) Filed: Oct. 8, 2018

(65) Prior Publication Data

US 2019/0042072 A1 Feb. 7, 2019

Related U.S. Application Data

(63) Continuation of application No. 14/472,784, filed on Aug. 29, 2014, now Pat. No. 10,139,986.

(30) Foreign Application Priority Data

Sep. 10, 2013 (JP) .............................. JP2013-187427

(51) Int. Cl.
*G06F 3/0481* (2013.01)
*G06F 3/0486* (2013.01)
(Continued)

(52) U.S. Cl.
CPC ........ *G06F 3/04817* (2013.01); *G06F 3/0486* (2013.01); *G06F 3/0488* (2013.01); *G06F 9/451* (2018.02)

(58) Field of Classification Search
CPC .. G06F 3/04817; G06F 3/0486; G06F 3/0488; G06F 9/451; G06F 9/4443; G06F 3/04842
See application file for complete search history.

(56) References Cited

U.S. PATENT DOCUMENTS 9,081,798 B1 7/2015 Wong
2007/0110338 A1* 5/2007 Snavely ............. G06K 9/00697
382/305
(Continued)

FOREIGN PATENT DOCUMENTS

JP 2012-065246 A 3/2012

OTHER PUBLICATIONS

Sugimoto et al. ("Hotaru: Intuitive Manipulation Techniques for Projected Displays of Mobile Devices", published 2005) (Year: 2005).*

(Continued)

*Primary Examiner* — Tan H Tran

(74) *Attorney, Agent, or Firm* — Chip Law Group

(57) ABSTRACT

There is provided an information processing apparatus including a display controller configured to cause a first icon to be displayed, an operation acquisition part configured to acquire a user operation for moving the first icon in a first area within a display surface, an area detector configured to detect an overlapping area in which the first area overlaps with a second area, the second area being present within the display surface and being different from the first area, and a metadata sharing processing part configured to share, between the first icon which is moved from the first area to the overlapping area and a second icon which is different from the first icon and is moved from the second area to the overlapping area, pieces of metadata associated with pieces of content corresponding to the respective icons.

11 Claims, 27 Drawing Sheets

(51) Int. Cl.
    *G06F 9/451*     (2018.01)
    *G06F 3/0488*    (2013.01)

(56) References Cited

U.S. PATENT DOCUMENTS

| | | | |
|---|---|---|---|
| 2008/0201664 A1* | 8/2008 | O | G06F 3/04817 715/835 |
| 2008/0229211 A1* | 9/2008 | Herberger | H04L 67/06 715/744 |
| 2008/0270188 A1* | 10/2008 | Garg | A61B 5/0022 705/3 |
| 2009/0324103 A1* | 12/2009 | Gelfand | G06F 16/58 382/224 |
| 2010/0313165 A1 | 12/2010 | Louch et al. | |
| 2011/0246894 A1 | 10/2011 | Luo et al. | |
| 2012/0068812 A1* | 3/2012 | Yamamoto | H04W 12/0602 340/5.1 |
| 2013/0061135 A1 | 3/2013 | Reinders et al. | |
| 2013/0179801 A1* | 7/2013 | Audet | G06F 3/0482 715/752 |
| 2015/0033143 A1* | 1/2015 | Lee | H04L 51/16 715/752 |

OTHER PUBLICATIONS

Office Action for CN Patent Application No. 201410444231.1, dated Dec. 4, 2018, 09 pages of Office Action and 13 pages of English Translation.
Office Action for CN Patent Application No. 201410444231.1, dated Jul. 4, 2018, 09 pages of Office Action and 13 pages of English Translation.
Sugimoto et al. "Hotaru: Intuitive Manipulation Techniques for Projected Displays of Mobile Devices." Human Computer Interaction—INTERACT 2005. Springer Berlin Heidelberg, 2005. pp. 57-68.
Notice of Allowance and Fees Due for U.S. Appl. No. 14/472,784, dated Jun. 12, 2018, 10 pages.
Non-Final Rejection for U.S. Appl. No. 14/472,784, dated Nov. 2, 2017, 19 pages.
Advisory Action for U.S. Appl. No. 14/472,784, dated Apr. 20, 2017, 03 pages.
Final Rejection for U.S. Appl. No. 14/472,784, dated Feb. 7, 2017, 19 pages.
Non-Final Rejection for U.S. Appl. No. 14/472,784, dated Aug. 25, 2016, 19 pages.

* cited by examiner

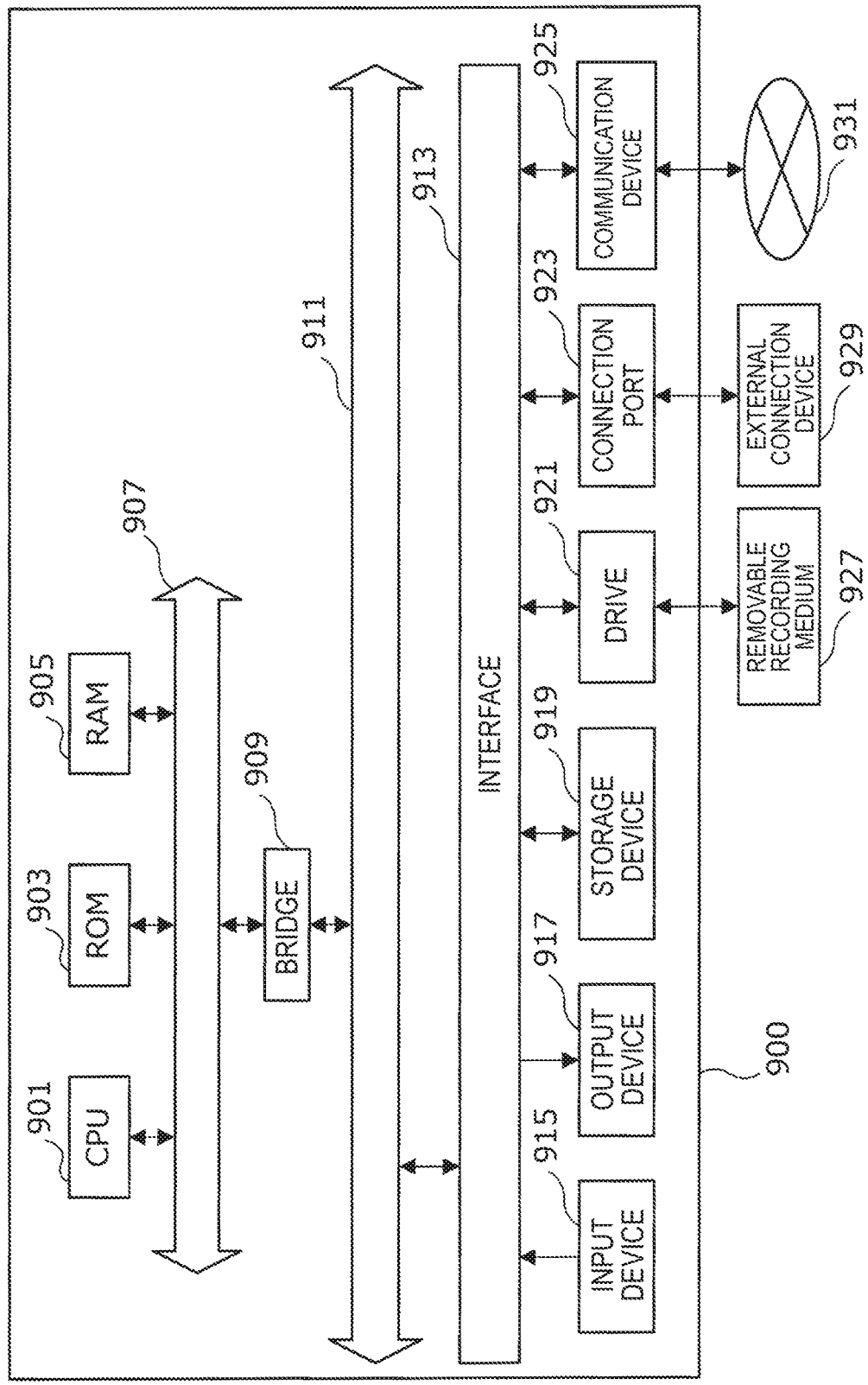

INFORMATION PROCESSING APPARATUS AND INFORMATION PROCESSING METHOD FOR IMAGING DISPLAY

CROSS REFERENCE TO RELATED APPLICATIONS

The present application is a continuation application of U.S. patent application Ser. No. 14/472,784, filed Aug. 29, 2014, which claims the benefit of priority from Japanese Priority Patent Application JP 2013-187427 filed Sep. 10, 2013 which are hereby incorporated by reference in their entirety for all purposes.

BACKGROUND

The present disclosure relates to an information processing apparatus, an information processing method, and a program.

There have recently been proposed various technologies for utilizing an image display in a versatile manner, which are not limited only to presentation of information. For example, JP 2012-65246A describes a technology in which a camera of a mobile device detects a signal for authentication projected from a fixed projector, and also a camera juxtaposed to the fixed projector detects an image for authentication displayed on a display part of the mobile device, and thus, the fixed projector and the mobile device authenticate each other. Further, JP 2012-65246A also describes a technology in which the same authentication is executed between mobile devices each having a built-in projector.

SUMMARY

In light of the foregoing, it is desirable to provide an information processing apparatus, an information processing method, and a program, which are novel and improved, and which are capable of utilizing an image display in a versatile manner and enhancing the usability.

According to an embodiment of the present disclosure, there is provided an information processing apparatus including a display controller configured to cause a first icon to be displayed, an operation acquisition part configured to acquire a user operation for moving the first icon in a first area within a display surface, an area detector configured to detect an overlapping area in which the first area overlaps with a second area, the second area being present within the display surface and being different from the first area, and a metadata sharing processing part configured to share, between the first icon which is moved from the first area to the overlapping area and a second icon which is different from the first icon and is moved from the second area to the overlapping area, pieces of metadata associated with pieces of content corresponding to the respective icons.

According to another embodiment of the present disclosure, there is provided an information processing method performed by a processor included in an information processing apparatus, the method including causing a first icon to be displayed, acquiring a user operation for moving the first icon in a first area within a display surface, detecting an overlapping area in which the first area overlaps with a second area, the second area being present within the display surface and being different from the first area, and sharing, between the first icon which is moved from the first area to the overlapping area and a second icon which is different from the first icon and is moved from the second area to the overlapping area, pieces of metadata associated with pieces of content corresponding to the respective icons.

According to another embodiment of the present disclosure, there is provided a program for causing a computer to achieve a function of causing a first icon to be displayed, a function of acquiring a user operation for moving the first icon in a first area within a display surface, a function of detecting an overlapping area in which the first area overlaps with a second area, the second area being present within the display surface and being different from the first area, and a function of sharing, between the first icon which is moved from the first area to the overlapping area and a second icon which is different from the first icon and is moved from the second area to the overlapping area, pieces of metadata associated with pieces of content corresponding to the respective icons.

According to one or more of embodiments of the present disclosure, an image display is used in a versatile manner and the usability can be enhanced.

Note that the effects described here are not necessarily limitative. With or in the place of the above effects, there may be achieved the effects described in this specification and/or other effects that are clear to those skilled in the art based on the description of this specification. That is, the effects described in this specification are merely illustrative or exemplified effects, and are not limitative.

BRIEF DESCRIPTION OF THE DRAWINGS

FIG. 27 is a block diagram showing a hardware configuration example of an information processing apparatus according to an embodiment of the present disclosure.

DETAILED DESCRIPTION OF THE EMBODIMENT(S)

Figure 1:
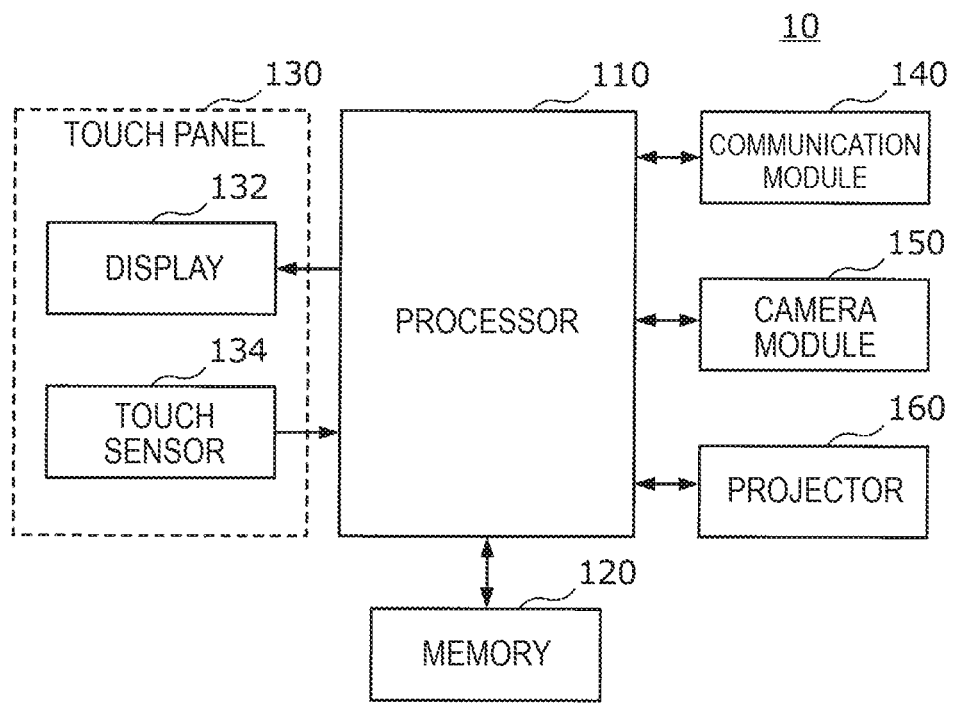
FIG. 1 is a block diagram showing a schematic device configuration of a system according to a first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be given in the following order.
1. First embodiment
  1-1. Device configuration
  1-2. Display example
  1-3. Functional configuration
  1-4. Modified example
2. Second embodiment
  2-1. Device configuration
  2-2. Display example
  2-3. Functional configuration
  2-4. Modified example
3. Third embodiment
  3-1. Device configuration
  3-2. Functional configuration
  3-3. Display example
4. Hardware configuration
5. Supplement

1. First Embodiment

A first embodiment of the present disclosure includes a configuration for sharing metadata of content using a projector.

1-1. Device Configuration

FIG. 1 is a block diagram showing a schematic device configuration of a system according to the first embodiment of the present disclosure. Referring to FIG. 1, a system 10 may include a processor 110, memory 120, a touch panel 130, a communication module 140, a camera module 150, and a projector 160. As will be described below, the system 10 may be achieved by including one or more information processing apparatuses. Note that a more specific hardware configuration example of the information processing apparatus will be described later.

System Implementation Example

For example, the entire system 10 may be implemented with a single information processing apparatus. In this case, the information processing apparatus may be a smartphone or a tablet terminal having the built-in camera module 150 and the built-in projector 160. In addition, the information processing apparatus may also be various types of personal computers (PC's), a game console, a media player, or a head-mounted terminal device. Alternatively, the information processing apparatus may not have the built-in camera module 150 and/or the built-in projector 160. In this case, the camera module 150 and/or the projector 160 which are/is not built in may be externally connected to connection ports/a connection port of the information processing apparatus.

Further, for example, the system 10 may be implemented as a system including an information processing apparatus of a server and an information processing apparatus of a client, the client having the built-in camera module 150 and the built-in projector 160 or having the camera module 150 and the projector 160 externally connected thereto. In this case, the information processing apparatus of the server and the information processing apparatus of the client each have a processor, and communicate with each other via a wired or wireless communication means. Functions of the processor 110 to be described later may be achieved concentratedly by a processor of any apparatus, or may be achieved in a distributed manner by processors of both apparatuses.

In this way, the system 10 can be implemented with a free combination of one or more information processing apparatuses, and the implementation examples are not limited to the examples described above.

(Functions of Each Structural Element)

The processor 110 is achieved by a CPU, a DSP, or an ASIC, for example, and achieves various functions by operating in accordance with a program stored in the memory 120. The processor 110 acquires various inputs by controlling directly or indirectly each part of the system 10, and provides various outputs. Note that details of functions achieved by the processor 110 will be described later.

The memory 120 can be achieved by, for example, appropriately combining semiconductor memory used as RAM or ROM, a storage device using a magnetic disk such as a HDD, an optical disc, or a magneto-optical disk, flash memory, or a removable medium. The memory 120 stores a program for the processor 110 to operate. The program may be continuously stored in the memory 120 for example, or may be downloaded from a server on a network through the communication module 140 and temporarily stored in the memory 120. Further, the memory 120 may also store data generated by a function achieved by the processor 110.

The touch panel 130 includes a display 132 and a touch sensor 134. The display 132 is achieved by an LCD or an organic EL display, for example, and displays an image in accordance with control performed by the processor 110. The touch sensor 134 is achieved by a sensor of an electro-static capacity-type or the like provided on the surface of the display 132, and detects touch of a user with the surface of the display 132. Note that the system 10 may also have other input means such as a mouse, a keyboard, a touch pad, or a button, and/or other output means such as a speaker or a vibrator, in addition to or instead of the touch panel 130.

The communication module 140 is achieved by various communication circuits that execute wired or wireless network communication in accordance with control performed by the processor 110. In the case of executing the wireless communication, the communication module 140 may include an antenna. The communication module 140 executes network communication in accordance with a communication standard of the Internet, a LAN, or Bluetooth (registered trademark), for example.

The camera module 150 is achieved by, for example, an image sensor such as a CCD or a CMOS, an optical system such as a lens for controlling image formation of a subject image on an image sensor, and a drive circuit for causing the image sensor and the optical system to drive. The camera module 150 provides the processor 110 with a still image or a video generated by the image sensor capturing the subject image as image data. Note that, as will be described later, the camera module 150 is disposed so as to acquire a captured image including at least a part of a projection of the projector 160.

The projector 160 is achieved by, for example, a light source such as a lamp and an LED, a liquid crystal display, an optical system such as a lens performing control such that an image is projected on a projection plane by light which has passed through the liquid crystal display from the light source, and a drive circuit for causing the light source, the liquid crystal display, and the optical system to drive. The projector 160 projects a still image or a video provided as image data by the processor 110 on a dedicated screen, on a desk surface, on a wall surface, or the like.

(Relationship Between Camera and Projector)

Figure 2:
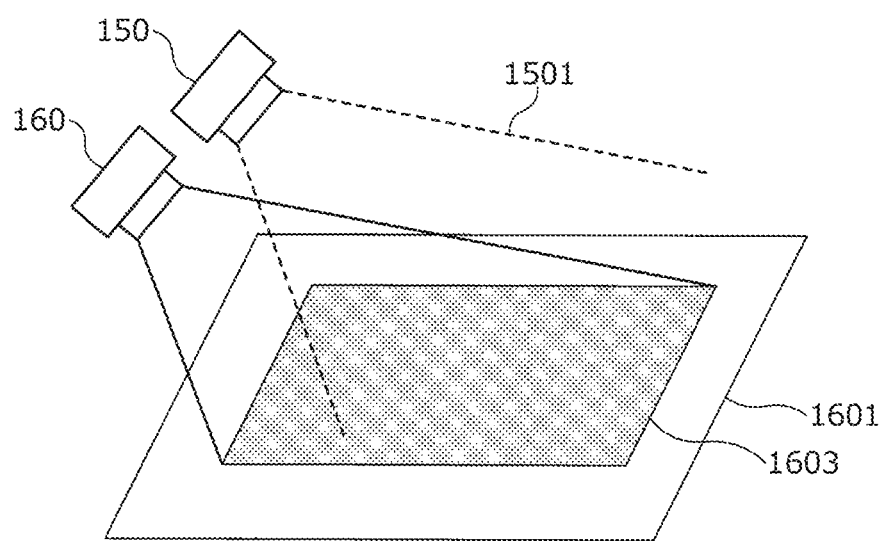
FIG. 2 is a diagram illustrating a relationship between a camera and a projector according to the first embodiment of the present disclosure.

FIG. 2 is a diagram illustrating a relationship between a camera and a projector according to the first embodiment of the present disclosure. Referring to FIG. 2, in the present embodiment, the camera module 150 and the projector 160 are disposed such that at least a part of a projection 1603 which is displayed by the projector 160 projecting an image on a projection plane 1601 is included in an angle of view 1501 of the camera module 150. That is, the camera module 150 is configured so as to acquire a captured image including at least a part of the projection 1603 of the projector 160.

Note that, as described above, the projection plane 1601 may be a dedicated screen, a desk surface, a wall surface, or the like. The positional relationship of the projection plane 1601 with respect to the projector 160 changes according to circumstances. Therefore, the camera module 150 is not necessarily capable of acquiring a captured image including the projection 1603 all the time. For example, in the case where the projection 1603 is at least visually recognizable by a user, the camera module 150 may be disposed so as to be able to acquire a captured image including the projection 1603. Further, in the case where the camera module 150 is moved by the user independently of the projector 160, the system 10 may lead, by using an image or an audio, the user to dispose the camera module 150 at a position at which the camera module 150 is capable of acquiring a captured image including the projection 1603.

In the first embodiment of the present disclosure, metadata of content is shared between users with the apparatus configuration described above. Note that, although the single system 10 is shown in the description above, in sharing metadata, multiple users use systems 10, respectively, the systems 10 being different from each other. In the description below (including descriptions of other embodiments), the multiple systems 10 may be referred to as system 10A, 10B, 10C, . . . (which may not necessarily be shown in the figures).

1-2. Display Example

Figure 3:
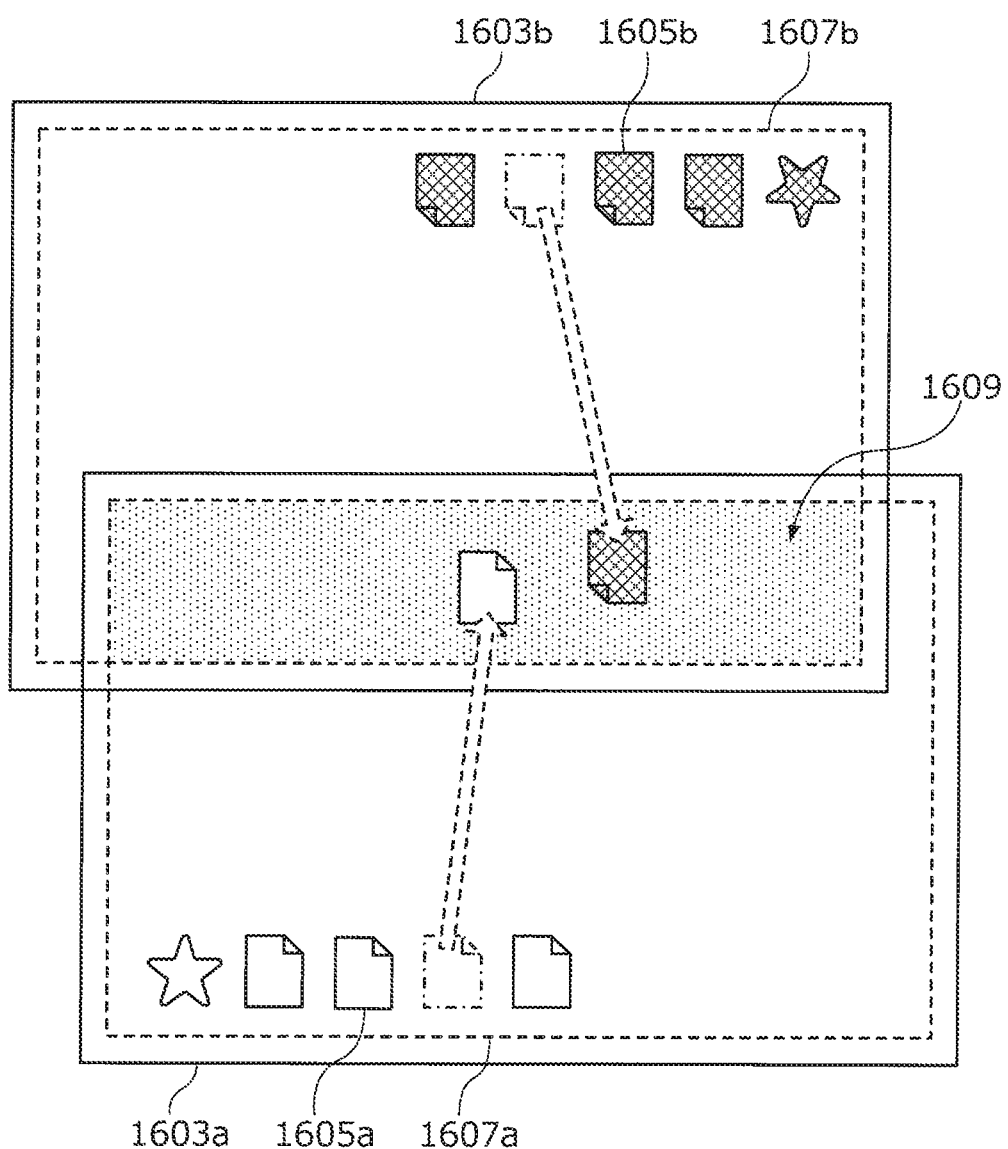
FIG. 3 is a diagram showing a display example according to the first embodiment of the present disclosure.

FIG. 3 is a diagram showing a display example according to the first embodiment of the present disclosure. Referring to FIG. 3, in the present embodiment, two projections, projections 1603a and 1603b, are displayed on the common projection plane 1601 by systems 10A and 10B used by two users (users A and B), respectively. On the projections 1603a and 1603b, icons 1605a and 1605b are displayed, respectively. The icons 1605 correspond to pieces of content stored in the memory 120 of the system 10A and the memory 120 of the system 10B, respectively. Further, on the projections 1603, areas 1607a and 1607b in which icons 1605 are included are disposed, respectively. In the example shown in the figure, since the area 1607 corresponds to nearly the whole of the projection 1603, the area 1607 is not visibly displayed on the projection 1603. In another example, the area 1607 may correspond to a part of the projection 1603. In such a case, the area 1607 may be visibly displayed on the projection 1603.

The users A and B can move the projections 1603 on the projection planes 1601 by changing the positions and the angles of the projectors 160 of the systems 10A and 10B, respectively. In the example shown in the figure, the areas 1607a and 1607b are overlapped with each other in an overlapping area 1609 as a result of such movement. Here, the overlapping area 1609 may be visibly displayed on the both projections 1603 as the example shown in the figure. Further, the users A and B can move the respective icons 1605 displayed in the areas 1607 with operations through the touch panels 130 of the respective systems 10A and 10B. On the display 132 included in each of the touch panels 130, an image including the projection 1603 captured by the camera module 150 is displayed, and the user performs a touch operation through the touch sensor 134 on the displayed icon 1605. Since the processor 110 recognizes the image projected by the projector 160 and the projection 1603 included in the image captured by the camera module 150 in association with each other, it is possible to move the icon 1605 with the touch operation on the captured image.

Note that, since the processor 110 retains original image data that the projector 160 is provided with, an image obtained by redrawing the image data in accordance with the size and the shape-change of the projection 1603 included in the captured image, for example, may be displayed on the display 132. Alternatively, the icon 1605 can be moved by detecting, by the camera module 150 or a separately provided sensor, movement of a user's hand or the like on the projection plane 1601, and performing, by the user, a touch operation directly on the icon 1605 within the projection 1603. In this case, the display 132 may not necessarily have an image displayed thereon.

As a result of the movement of the icons 1605 performed by the users A and B in the above described manner, in the case where, as the example shown in the figure, the icon 1605a is moved from the area 1607a to the overlapping area 1609 and the icon 1605b is moved from the area 1607b to the overlapping area 1609, the processors 110 of the systems 10 each execute a process of sharing, between the icons 1605a and 1605b, pieces of metadata associated with pieces of content corresponding to the respective icons. Hereinafter, a functional configuration of the system 10 for achieving such functions will be further described. Note that, although the case of using the system 10A will be described as an example in the description below, the functional configuration of the system 10B are also the same.

1-3. Functional Configuration

Figure 4:
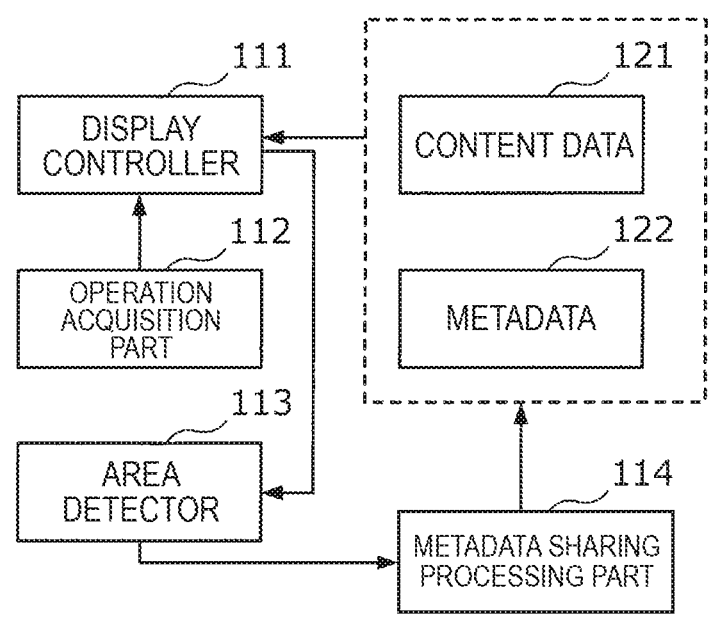
FIG. 4 is a block diagram showing a schematic functional configuration of a system according to the first embodiment of the present disclosure.

FIG. 4 is a block diagram showing a schematic functional configuration of a system according to the first embodiment of the present disclosure. Referring to FIG. 4, in the present embodiment, the processor 110 included in the system 10A achieves each of the functions of a display controller 111, an operation acquisition part 112, an area detector 113, and a metadata sharing processing part 114. Further, in the present embodiment, the memory 120 included in the system 10A stores content data 121 and metadata 122.

The display controller 111 controls the projector 160 and causes the icon 1605a (first icon) to be projected on the projection plane 1601 (display surface). The icon 1605a corresponds to content stored in the memory 120 as the content data 121. The type of the content may be any, such as a still image, a video, an audio, or a document. The icon 1605a may be displayed in various shapes in accordance with the type of the content and with whether the content is a favorite (the example of FIG. 3 shows a star-shaped icon representing favorite content and icons each representing other content). In addition, the display controller 111 may also control the display 132 and cause the icon 1605a to be displayed on a screen. As described above, the icon 1605a displayed on the screen of the display 132 may be displayed for causing the icon 1605a to be moved by the user's touch operation through the touch sensor 134.

Further, in the case where the area 1607a corresponds to only a part of the projection 1603, for example, the display controller 111 may cause the area 1607 (first area) in which the icon 1605a is disposed to be visibly displayed on the projection plane 1601. Additionally, the display controller 111 may also cause the overlapping area 1609 to be visibly displayed on the projection plane 1601.

The operation acquisition part 112 acquires a user operation for moving the icon 1605a (first icon) in the area 1607a (first area) within the projection plane 1601 (display surface). For example, the operation acquisition part 112 acquires the user operation through the touch sensor 134 included in the touch panel 130. To be more specific, the operation acquisition part 112 acquires a touch operation performed by the user on the icon 1605a displayed on the screen of the display 132 through the touch sensor 134. Alternatively, the operation acquisition part 112 may acquire the touch operation that the user performed directly on the icon 1605a within the projection 1603a through the camera module 150 or a separately provided sensor.

The area detector 113 detects the overlapping area 1609, the overlapping area 1609 being the area in which the area 1607a (first area) overlaps with the area 1607b (second area), the area 1607b being present within the projection plane 1601 (display surface) and being different from the area 1607a. The area detector 113 detects the overlapping area 1609 on the basis of an image captured by the camera module 150, for example. To be more specific, for example, the area detector 113 compares original image data provided to the projector 160 with the projection 1603a included in the image captured by the camera module 150, and detects the area estimated to be overlapped with another projection within the area 1607a included in the projection 1603a as the overlapping area 1609. Alternatively, the area detector 113 may detect the overlapping area 1609 by receiving original image data of the projection 1603b of the system 10B and/or data of an image captured by the camera module 150 of the system 10B side through the communication module 140, and comparing the original image data and/or the data of the captured image with the projection 1603a included in an image captured by the camera module 150.

The metadata sharing processing part 114 shares, between the icon 1605a (first icon) which is moved from the area 1607a (first area) to the overlapping area 1609 and the icon 1605b (second icon) which is moved from the area 1607b (second area) to the overlapping area 1609, pieces of metadata associated with pieces of content corresponding to the respective icons. As described above, the icon 1605a corresponds to content stored in the memory 120 as the content data 121 in the system 10A. In the same manner, the icon 1605b corresponds to content similarly stored in the memory 120 in the system 10B. The metadata sharing processing part 114 executes, in the case where both of the icon 1605a and the icon 1605b are moved to the overlapping area 1609, the sharing processing of metadata between the pieces of content corresponding to the respective icons.

To be more specific, for example, in the case where the icon 1605*a* and the icon 1605*b* are moved to the overlapping area 1609, the metadata sharing processing part 114 of the system 10A receives content data and/or metadata associated with content of the icon 1605*b* from the system 10B through the communication module 140. For example, the metadata sharing processing part 114 executes analysis of images included in the pieces of content corresponding to the respective icons 1605*a* and 1605*b*, and, in the case where the images are similar to each other, the metadata may be shared between the pieces of content. In this case, the metadata sharing processing part 114 of the system 10A may first receive only the content data from the system 10B and, in the case where it is determined that the sharing processing of the metadata is to be executed on the basis of the content data, may additionally receive the metadata from the system 10B.

Alternatively, the metadata sharing processing part 114 may share, in the case where there are some common items that are included in the pieces of metadata associated with the pieces of content corresponding to the respective icons 1605*a* and 1605*b*, the metadata between the pieces of content. For example, this is the case where, between pieces of metadata of pieces of image content (photographs) corresponding to the respective icons 1605*a* and 1605*b*, the items of shooting dates/times and shooting locations are common, but the pieces of tag information indicating accompanying person(s) are not common. In such a case, the metadata sharing processing part 114 executes processing of sharing the pieces of tag information between the respective pieces of metadata.

Here, the sharing processing of metadata executed by the metadata sharing processing part 114 may also be processing of complementing unset items in the respective pieces of metadata, for example. For example, in the case where the pieces of metadata of the pieces of image content (photographs) are similar in images and are common in the items of shooting dates/times in the pieces of metadata, the metadata sharing processing part 114 copies the information of the shooting location set in the metadata of the content (which is referred to as content B) corresponding to the icon 1605*b* to the corresponding item which is unset in the metadata of the content (which is referred to as content A) corresponding to the icon 1605*a*. Further, in this example, if the tag information indicating accompanying person(s) is set in the content A and is unset in the content B, the metadata sharing processing part 114 copies the corresponding item from the metadata of the content A to the metadata of the content B. In the case where the metadata sharing processing part 114 of the system 10A changes the metadata of the content B received from the system 10B, the metadata sharing processing part 114 transmits the changed metadata to the system 10B through the communication module 140.

Further, for example, the metadata sharing processing executed by the metadata sharing processing part 114 may be, for example, processing of overwriting metadata with another piece of metadata. For example, in the case where the pieces of metadata of the pieces of image content (photographs) are similar in images and are common (not necessarily the same) in the items of shooting dates/times in the pieces of metadata, the metadata sharing processing part 114 of the system 10A may overwrite the metadata of the content A with the metadata of the content B. According to such processing, for example, time stamps of images of the same subjects captured by multiple apparatuses whose clocks are slightly different from each other are unified, and can arrange the images in a common time-series order.

Heretofore, a basic example of the first embodiment of the present disclosure has been disclosed. Hereinafter, various modified examples which are adoptable in the present embodiment will be described.

1-4. Modified Example

First Modified Example

Figure 5:
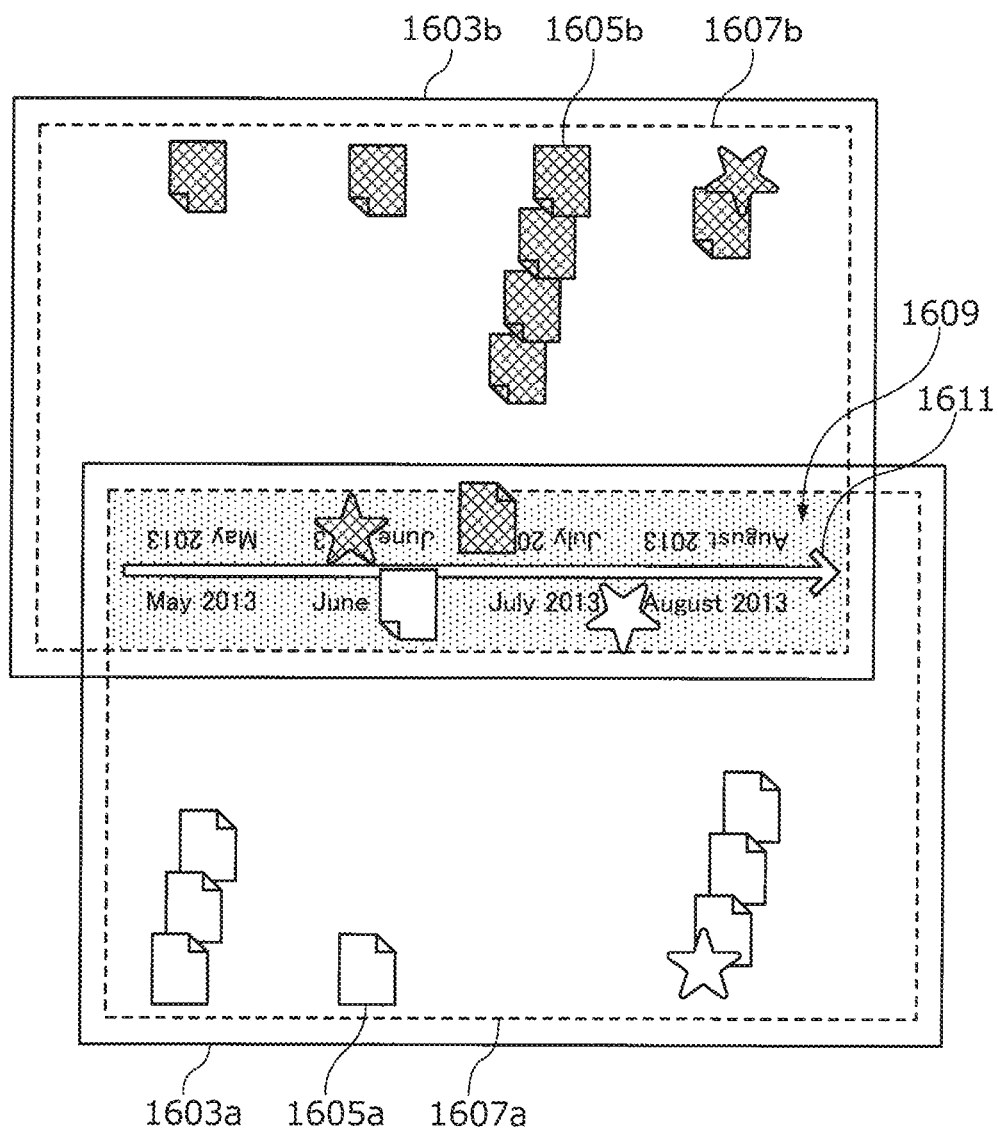
FIG. 5 is a diagram showing a first modified example according to the first embodiment of the present disclosure.

FIG. 5 is a diagram showing a first modified example according to the first embodiment of the present disclosure. Referring to FIG. 5, in the projection 1603, a time axis 1611 is displayed in the overlapping area 1609, and the icons 1605*a* and 1605*b* displayed in the respective areas 1607*a* and 1607*b* are arranged in accordance with the common time axis 1611. In this example, the display controllers 111 of the respective systems 10A and 10B refer to shooting dates/times recorded as pieces of metadata associated with pieces of content (images) corresponding to the icons 1605, and arrange the icons 1605 in the projections 1603*a* and 1603*b* such that the shooting dates/times correspond to the time axis 1611. Note that, here, the time axis is an example of a classification axis that supports an item included in the metadata. In addition, a classification axis may be displayed on the basis of an item which is not necessarily numerically expressed, such as position information or tag information.

Here, the time axis 1611 may not necessarily correspond to shooting dates/times of all pieces of content. That is, a time period displayed for the time axis 1611 corresponds to some of the pieces of shooting dates/times, and the pieces of content displayed as the icons 1605 may be limited to the ones having shooting dates/times in the corresponding time period. In this case, if the time axis 1611 is scrolled by an operation of any of the users of the systems 10A and 10B the time period that the time axis 1611 displays is changed, and the icons 1605 arranged in the areas 1607*a* and 1607*b* may be updated in association.

Further, in the example shown in the figure, the icons 1605 disposed in the overlapping area 1609 are displayed in a manner that the icons 1605 each face toward the other area. That is, of the icons 1605 disposed in the overlapping area 1609, the icon 1605*a* that has been moved from the area 1607*a* to the overlapping area 1609 is displayed so as to face toward the area 1607*b*, and the icon 1605*b* that has been moved from the area 1607*b* to the overlapping area 1609 is displayed so as to face toward the area 1607*a*. Note that the direction in which each icon 1605 faces is easily understood by referring to the direction in which the star-shaped icon shown in the figure faces, for example. This processing aims at, based on the assumption that a user (user A) of the system 10A observes the projection 1603 from a side of the area 1607*a* and a user (user B) of the system 10B observes the projection 1603 from a side of the area 1607*b*, making it easier for the users to visually recognize content at the other user's side, the content being a target of metadata sharing.

Since the processing related to the directions of the icons 1605 is not directly related to the processing of displaying the time axis 1611, those examples may be independent of each other. That is, even in the case where the time axis 1611 is not displayed, the icons 1605 may be displayed such that the icons 1605 each face toward the other area.

Note that the two examples described with reference to FIG. 5 may be useful for the case of sharing content itself corresponding to an icon 1605 disposed in the overlapping area 1609 between users. That is, in other embodiments of the present disclosure, the examples described above are used not only for the sharing of metadata of content, but also for the sharing of content.

Second Modified Example

Figure 6:
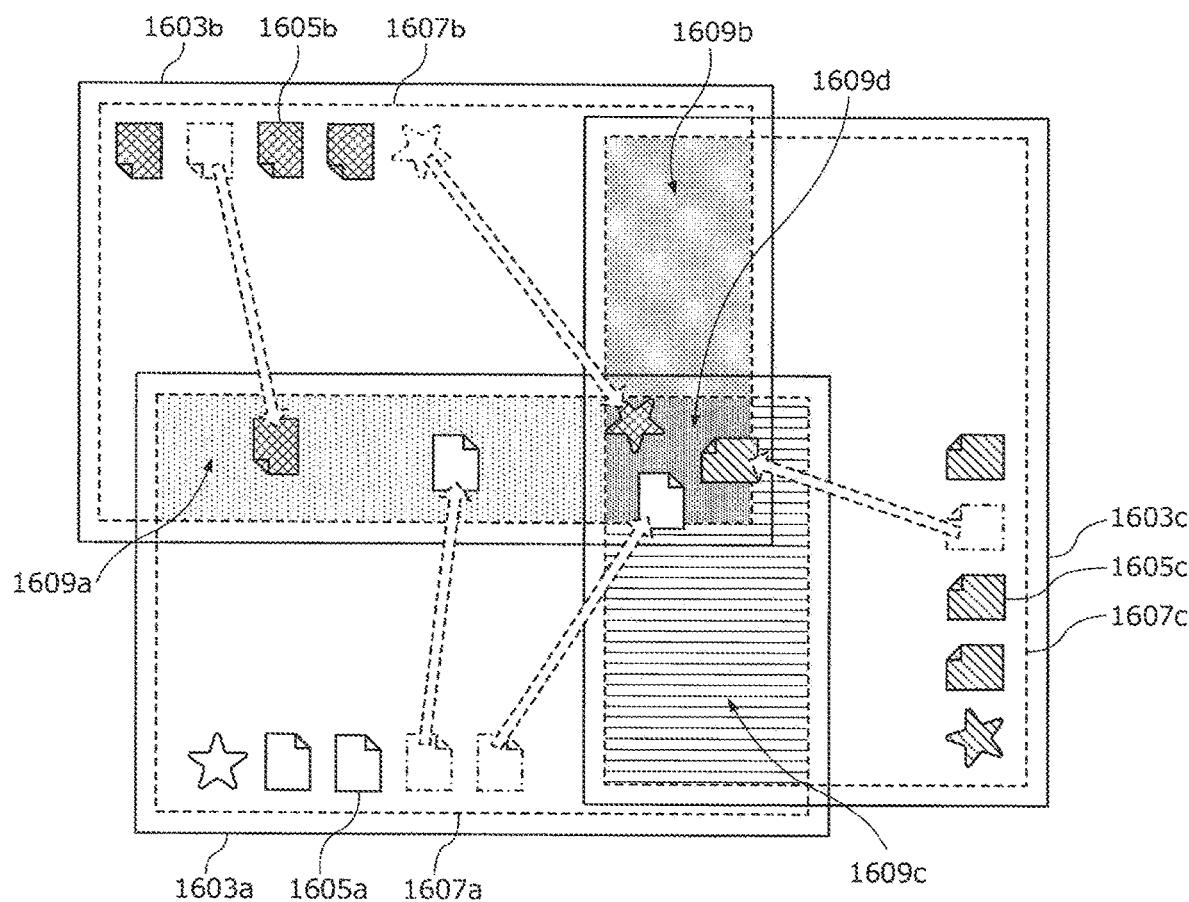
FIG. 6 is a diagram showing a second modified example according to the first embodiment of the present disclosure.

FIG. 6 is a diagram showing a second modified example according to the first embodiment of the present disclosure. Referring to FIG. 6, systems 10A to 10C used by three users (users A to C) display three projections 1603a to 1603c, respectively, on a common projection plane 1601. On the projections 1603a to 1603c, icons 1605a to 1605c are displayed, respectively. The icons 1605 correspond to pieces of content stored in the memory 120 of the system 10A, the memory 120 of the system 10B and the memory 120 of the system 10C, respectively. Further, on the projections 1603, areas 1607a to 1607c in which icons 1605 are included are disposed, respectively. The area 1607 may correspond to the whole of the projection 1603 as the example shown in the figure, or may correspond to a part of the projection 1603.

The users A to C can move the projections 1603 on the projection plane 1601 by changing the positions and the angles of the projectors 160 of the respective systems 10A to 10C. In this way, in the example shown in the figure, the areas 1607a to 1607c are overlapped with each other in overlapping areas 1609. The overlapping areas 1609 include an overlapping area 1609a of the areas 1607a and 1607b, an overlapping area 1609b of the areas 1607b and 1607c, an overlapping area 1609c of the areas 1607c and 1607a, and an overlapping area 1609d in which all the areas 1607a to 1607c are overlapped. Those overlapping areas 1609 may be visibly displayed (for example, in different colors from each other) so as to be identifiable from each other on the respective projections 1603. Alternatively, the colors of the areas 1607a to 1607c may be set such that the overlapping areas 1609 are naturally identifiable from the mixtures of those colors. Further, the users A to C are also capable of moving icons 1605 displayed in the areas 1607 by operations through the touch panels 130 of the respective systems 10A to 10C, and of disposing the icons 1605 in the overlapping areas 1609.

In the present modified example, the sharing processing of metadata between icons 1605 disposed in an overlapping area 1609 varies depending on which of the areas 1607 are overlapped with each other in the corresponding overlapping area 1609. For example, into the overlapping area 1609a (the areas 1607a and 1607b are overlapped with each other), the icon 1605a and the icon 1605b can be moved. Accordingly, the overlapping area 1609a is used for the sharing of metadata of content between the systems 10A and 10B. Note that, since the icon 1605c cannot be moved to the overlapping area 1609a (the overlapping area 1609a is not included in the area 1607c), the system 10C is excluded from a target of metadata sharing when the overlapping area 1609a is used.

On the other hand, into the overlapping area 1609d (all the areas 1607a to 1607c are overlapped with each other), any of the icons 1605a to 1605c can be moved. Accordingly, the overlapping area 1609d is used for the sharing of metadata of content between any of the systems 10A to 10C. That is, only the icons 1605a and 1605b may be moved into the overlapping area 1609d and the metadata sharing may be executed between the systems 10A and 10B or the icons 1605a to 1605c may be moved into the overlapping area 1609d and the metadata sharing may be executed among the systems 10A to 10C.

In this way, the target of metadata sharing is set in accordance with the areas 1607 overlapped in the overlapping area 1609, and thus, the range in which the metadata is shared can be grasped visually and a user can execute the metadata sharing free from anxiety.

Note that the metadata sharing among three or more systems 10 may be executed by setting the priority order among the systems, for example. In this case, if the items of metadata compete with each other, the item of metadata of the system having higher order is employed with priority.

Figure 7:
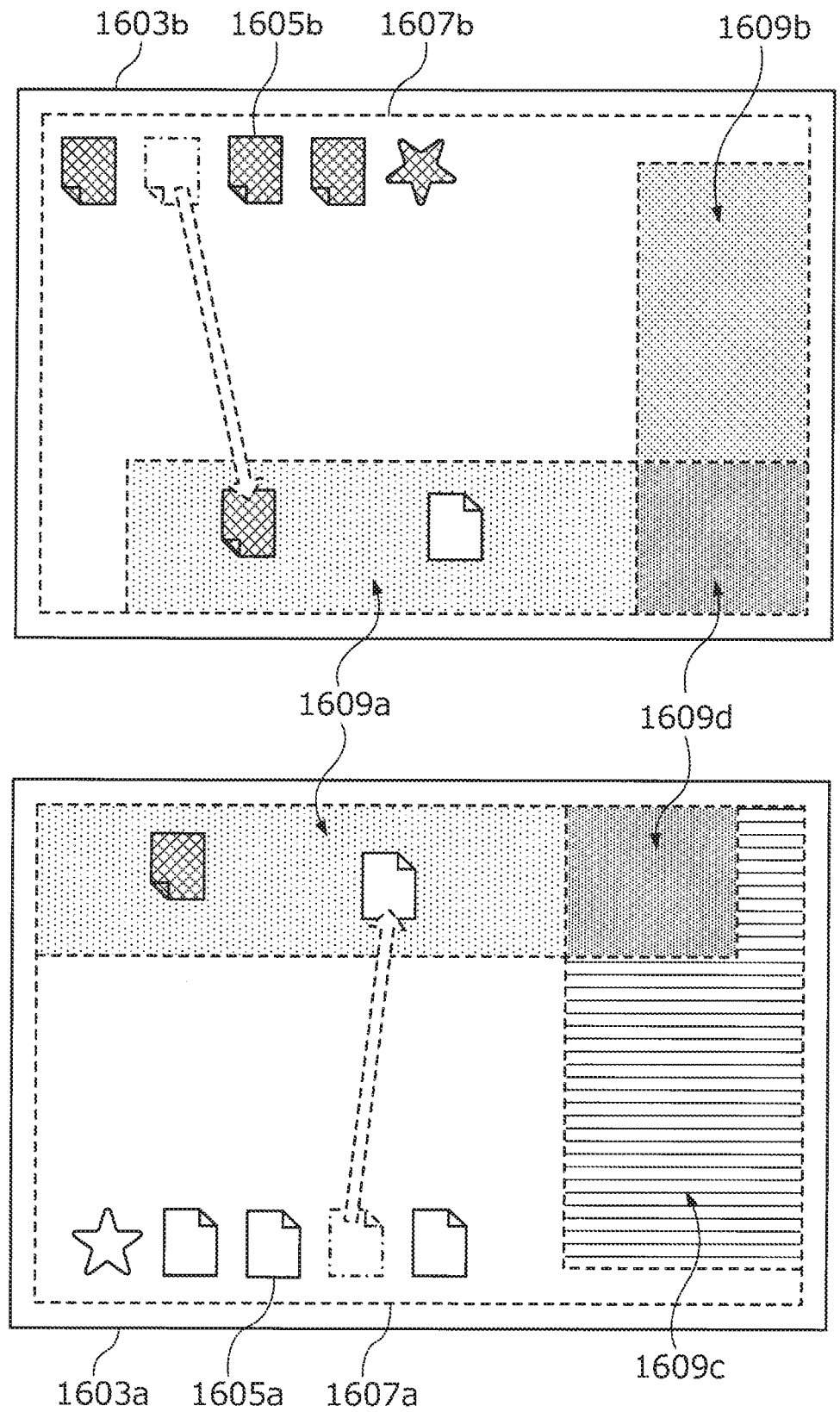
FIG. 7 is a diagram showing an example in which an overlapping area is maintained even after overlapping of areas has been cancelled in the example shown in FIG. 6.

FIG. 7 is a diagram showing an example in which an overlapping area is maintained even after overlapping of areas has been cancelled in the example shown in FIG. 6. Referring to FIG. 7, the positional relationship between the projections 1603a to 1603c shown in FIG. 6 has been changed due to further change performed by the users A to C on the positions and the angles of the projectors 160, and thus, the overlapping of the areas 1607a to 1607c is cancelled. However, in the example shown in the figure, since an application for sharing metadata of content is continuously activated in the systems 10A to 10C, the display controller 111 of each system 10 continuously displays a virtual overlapping area 1609. Note that, for the sake of simplification, the area 1607c is not shown in FIG. 7, but the area 1607c may have a similar display.

For example, in the case where the overlapping area 1609 is naturally identifiable from the mixtures of colors while the areas 1607 are actually overlapped with each other, the display controller 111 changes the display such that the overlapping area 1609 has a color different from the color of the area 1607 when the overlapping of the areas 1607 is cancelled. Alternatively, in the case where the overlapping area 1609 is displayed in a color different from the color of the area 1607 also while the area 1607 is actually overlapped, the display controller 111 maintains the similar display even after the overlapping of the areas 1607 has been cancelled. In the case of terminating the virtual display of the overlapping area 1609, a menu may be called by performing a press-and-hold operation on the overlapping area 1609, and the display may be terminated. Alternatively, the virtual display of the overlapping area 1609 may be terminated by dragging the overlapping area 1609 toward the outside of the projection 1603.

In this case, the overlapping area 1609 displayed virtually on each projection 1603 functions in the same manner as the case where the areas 1607 are actually overlapped with each other. That is, in the case where, as the example shown in the figure, the icon 1605a is moved into the overlapping area 1609a on the projection 1603a and the icon 1605b is also moved into the overlapping area 1609a on the projection 1603b, the sharing processing of metadata of the pieces of content corresponding to the respective icons 1605a and 1605b is executed between the systems 10A and 10B. In this case, an icon 1605 of the sharing partner may be displayed in the overlapping area 1609, on the basis of information that the display controller 111 has received through the communication module 140. In the example shown in the figure, information related to the icon 1605 is exchanged between the systems 10A and 10B and, the icon 1605b is virtually displayed in the overlapping area 1609a on the projection 1603a and the icon 1605a is virtually displayed in the overlapping area 1609a on the projection 1603b. The virtual displays of the icons 1605 are possible in the case where the systems 10A and 10B are communicable with each other through a network. When the communication between the systems 10A and 10B is disconnected, the virtually displayed icons 1605 disappear. In this case, the overlapping area 1609 may also be continuously displayed while allowing the color of the overlapping area 1609 to become pale, for example, to express the fact that the communication is disconnected.

Note that the example shown in FIG. 7 is not limited to the case of sharing metadata among three systems 10, and, as shown in the examples of FIG. 3 and FIG. 5, is also applicable to the case of sharing metadata between two systems 10 and the case of sharing metadata between four or more systems 10. Further, the examples shown in FIG. 6 and FIG. 7 may also be useful for the case of sharing content itself corresponding to an icon 1605 disposed in the overlapping area 1609 between users. That is, in other embodiments of the present disclosure, the examples described above are used not only for the sharing of metadata of content, but also for the sharing of content.

Third Modified Example

Figure 8:
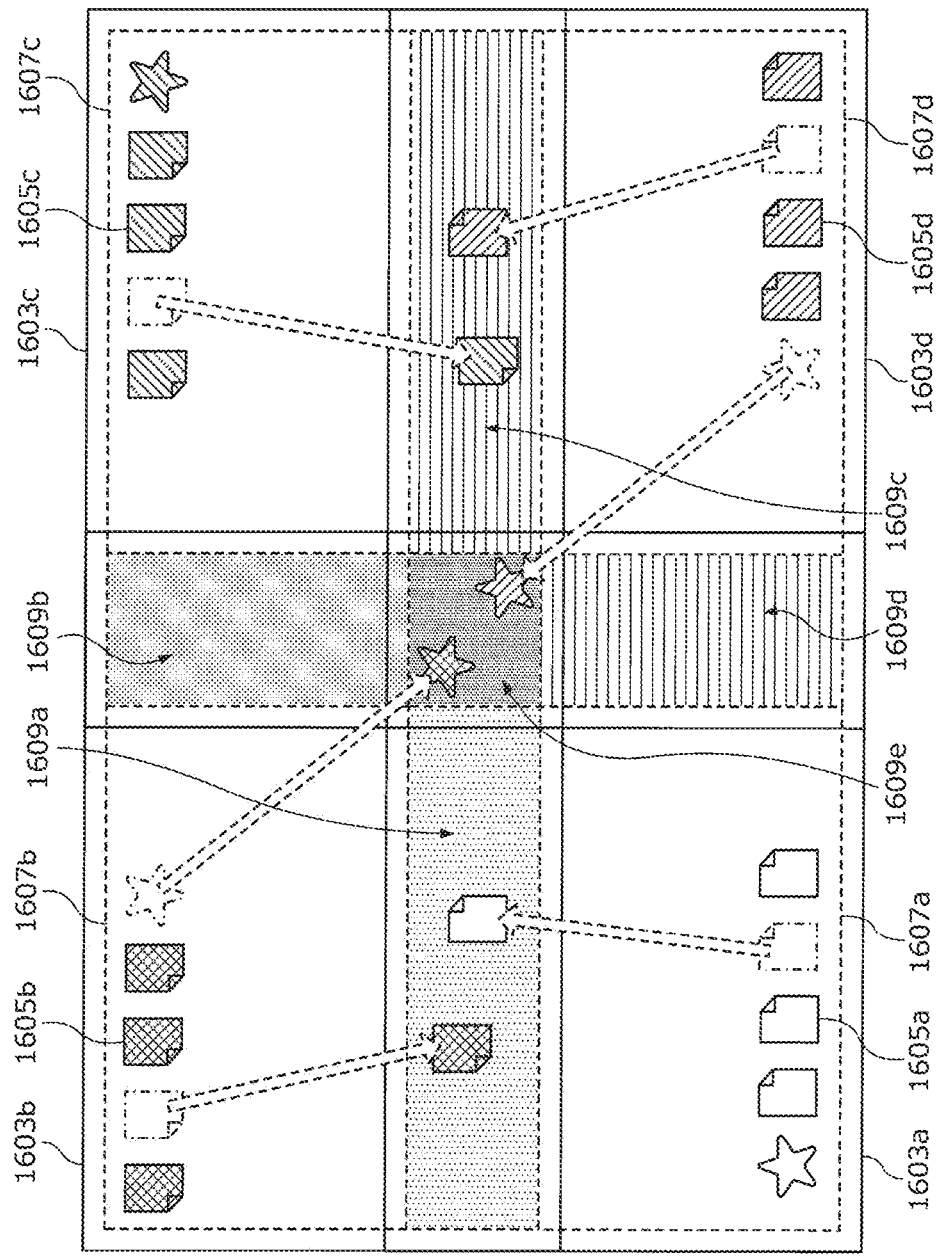
FIG. 8 is a diagram showing a third modified example according to the first embodiment of the present disclosure.

FIG. 8 is a diagram showing a third modified example according to the first embodiment of the present disclosure. Referring to FIG. 8, systems 10A to 10D used by four users (users A to D) display four projections 1603a to 1603d, respectively, on a common projection plane 1601. On the projections 1603a to 1603d, icons 1605a to 1605d are displayed, respectively. The icons 1605 correspond to pieces of content stored in the memory 120 of the system 10A, the memory 120 of the system 10B the memory 120 of the system 10C, and the memory 120 of the system 10D, respectively. On the projections 1603, areas 1607a to 1607d in which icons 1605 are included are disposed, respectively. The area 1607 may correspond to the whole of the projection 1603 as the example shown in the figure, or may correspond to a part of the projection 1603.

The users A to D can move the projections 1603 on the projection plane 1601 by changing the positions and the angles of the projectors 160 of the respective systems 10A to 10D. In this way, in the example shown in the figure, the areas 1607a to 1607d are overlapped with each other in overlapping areas 1609. The overlapping areas 1609 include an overlapping area 1609a of the areas 1607a and 1607b, an overlapping area 1609b of the areas 1607b and 1607c, an overlapping area 1609c of the areas 1607c and 1607d, an overlapping area 1609d of the areas 1607d and 1607a, and an overlapping area 1609e in which all the areas 1607a to 1607d are overlapped. Those overlapping areas 1609 may be visibly displayed (for example, in different colors from each other) so as to be identifiable from each other on the respective projections 1603. Alternatively, the colors of the areas 1607a to 1607d may be set such that the overlapping areas 1609 are naturally identifiable from the mixtures of those colors. Further, the users A to D are also capable of moving icons 1605 displayed in the areas 1607 by operations through the touch panels 130 of the respective systems 10A to 10D, and of disposing the icons 1605 in the overlapping areas 1609.

Figure 9:
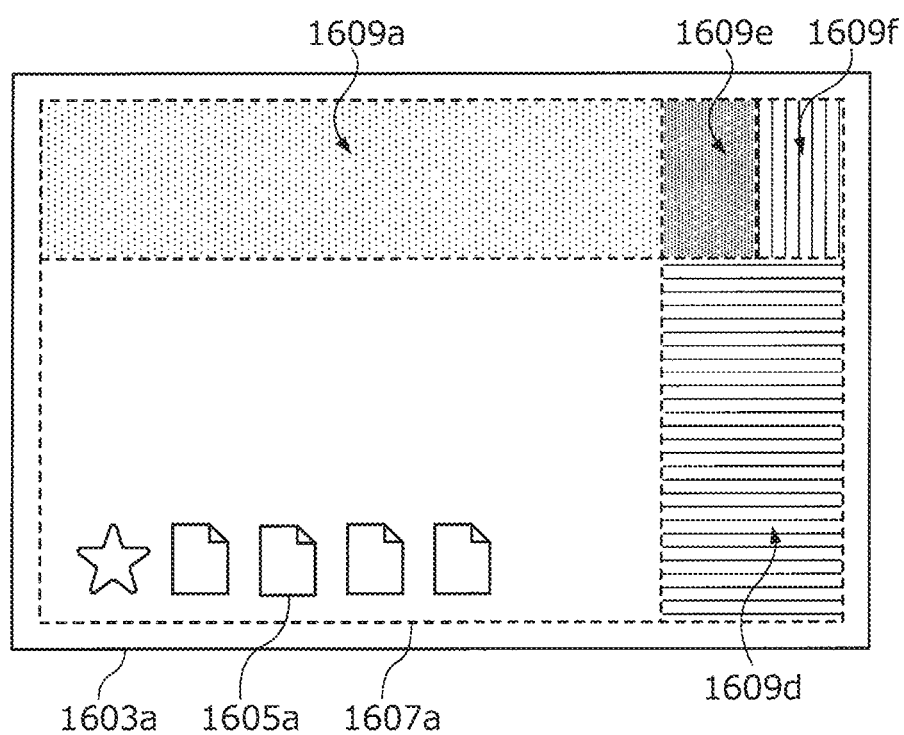
FIG. 9 is a diagram showing an example in which an overlapping area is maintained even after overlapping of areas has been cancelled in the example shown in FIG. 8.

FIG. 9 is a diagram showing an example in which an overlapping area is maintained even after overlapping of areas has been cancelled in the example shown in FIG. 8. In the example shown in FIG. 9, in the same manner as the example described with reference to FIG. 7, the display controller 111 of each system 10 continuously displays a virtual overlapping area 1609 even after the positional relationship between the projections 1603a to 1603d has been changed and the overlapping of the areas 1607a to 1607d has been cancelled. Note that, for the sake of simplification, the area 1607a is shown in FIG. 9 as a representative, but the other areas 1607 may also have similar displays.

Here, in the projection 1603a shown in FIG. 9, the overlapping area 1609a (corresponding to the area in which the areas 1607a and 1607b are overlapped with each other), the overlapping area 1609d (corresponding to the area in which the areas 1607d and 1607a are overlapped with each other), and the overlapping area 1609e (corresponding to the area in which all the areas 1607a to 1607d are overlapped) are virtually displayed, and a virtual overlapping area 1609f is displayed separately from the overlapping area 1609e (which is an overlapping area in which the area 1607a overlaps with two or more of the areas 1607b to 1607d). The overlapping area 1609f is handled as the area in which the area 1607a is overlapped with the area 1607c (a part of the areas 1607b to 1607d overlapped with the area 1607a within the overlapping area 1609e).

In the example shown in the figure, with the display of the overlapping area 1609f, there are displayed on the projection 1603a the areas (overlapping areas 1609a, 1609d, and 1609f) that overlap individually with the respective areas 1607b, 1607c, and 1607d and the area (overlapping area 1609e) that overlaps with all the areas 1607b to 1607d. Accordingly, the user A can use different overlapping areas 1609 for disposing an icon 1605, for the case where the user A wants to share metadata individually with the user B, the user C, or the user D and for the case where the user A wants to share metadata with all the users B to D.

Figure 10A:
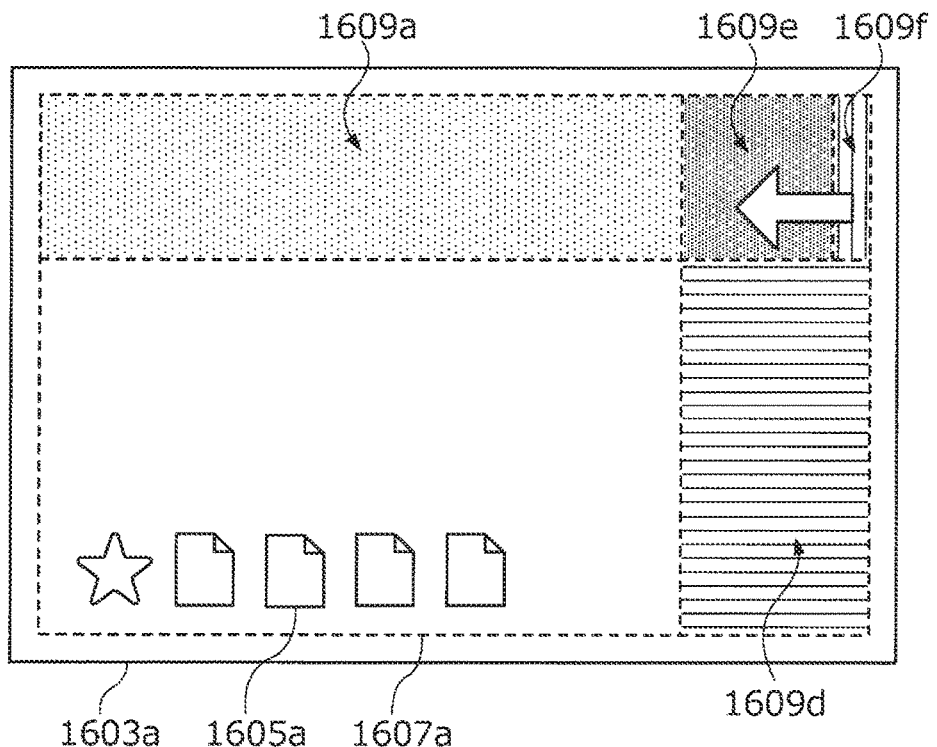
FIG. 10A is a diagram showing an example in which the overlapping area changes in accordance with a user operation in the example shown in FIG. 9.
Figure 10B:
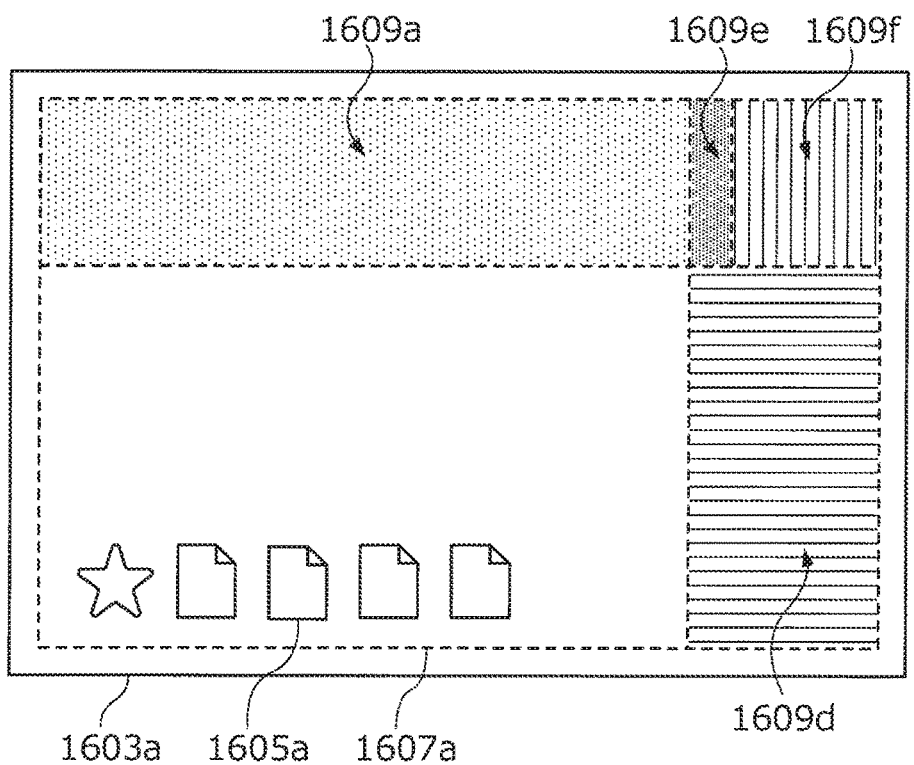
FIG. 10B is a diagram showing an example in which the overlapping area changes in accordance with a user operation in the example shown in FIG. 9.

FIGS. 10A and 10B are each a diagram showing an example in which the overlapping area changes in accordance with a user operation in the example shown in FIG. 9. In the example shown in FIG. 9, the overlapping area 1609f is displayed in a manner that the overlapping area 1609f is wedged into the overlapping area 1609e. Accordingly, the size of the overlapping area 1609e and the size of the overlapping area 1609f may not be large enough for disposing an icon 1605. Consequently, in the example shown in FIG. 10A, the overlapping area 1609f is initially displayed in a minimized size. In this state, it is easy to dispose the icon 1605 in the overlapping area 1609e, but it is not easy to dispose the icon 1605 in the overlapping area 1609f.

Consequently, in the case where the user wants to dispose the icon 1605 in the overlapping area 1609f, the user can enlarge the overlapping area 1609f from the state shown in FIG. 10A to the state of the example shown in FIG. 10B, by dragging the overlapping area 1609f in the direction indicated by the arrow or tapping the overlapping area 1609f, for example. In this state, it becomes easy to dispose the icon 1605 in the overlapping area 1609f. On the other hand, the overlapping area 1609e which has been minimized by the above operation can be enlarged again to the state shown in FIG. 10A by performing dragging and tapping operations in the same manner as the overlapping area 1609f.

Note that the examples shown in FIGS. 8, 9, 10A, and 10B are not limited to the case of displaying four projections 1603, and is also applicable to the case of displaying five or more projections 1603, for example. Further, the examples shown in FIGS. 8, 9, 10A, and 10B may also be useful for the case of sharing content itself corresponding to an icon 1605 disposed in the overlapping area 1609 between users.

Fourth Modified Example

FIGS. 11A, 11B, 12A, 12B, 13A, 13B, 14A, 14B, 14C, 15A, and 15B are each a diagram showing a fourth modified example according to the first embodiment of the present disclosure. Referring to FIGS. 11A, 11B, 12A, 12B, 13A, 13B, 14A, 14B, 14C, 15A, and 15B, areas 1607a to 1607d sequentially overlap on top of each other centering around the area 1607a, the areas 1607a to 1607d being included in four projections 1603a to 1603d, respectively, the four projections 1603a to 1603d being displayed on a common projection plane 1601 by systems 10A to 10D used by four users (users A to D), respectively. In this way, on the projections 1603, overlapping areas 1609 corresponding to the respective areas are sequentially formed.

Figure 11A:
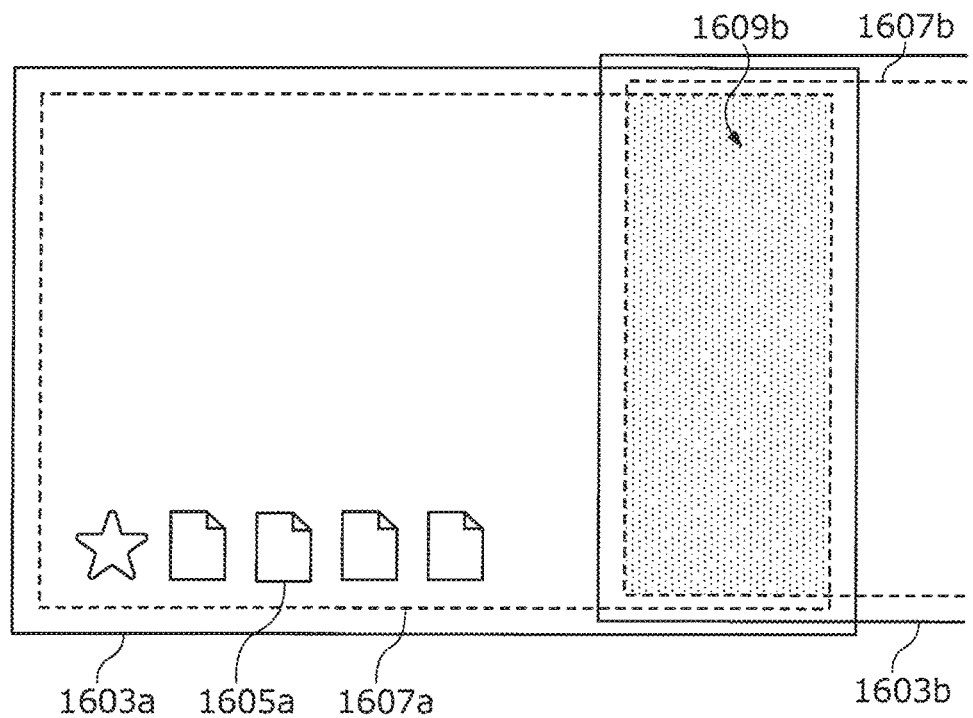
FIG. 11A is a diagram showing a fourth modified example according to the first embodiment of the present disclosure.
Figure 11B:
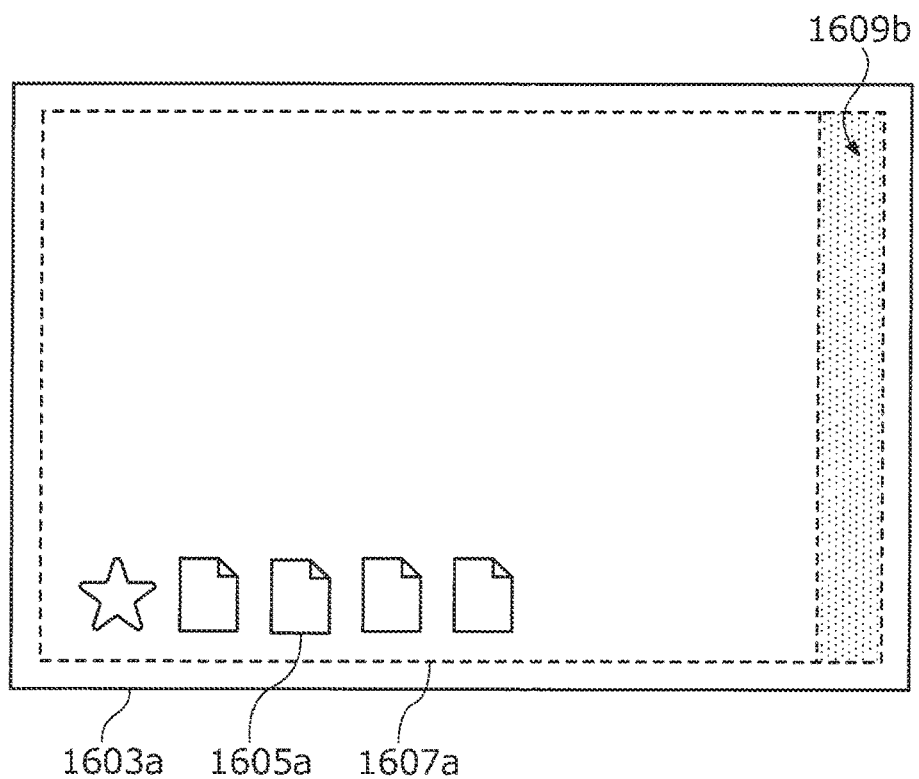
FIG. 11B is a diagram showing the fourth modified example according to the first embodiment of the present disclosure.

In the example shown in FIG. 11A, the right end part of the area 1607a overlaps with the area 1607b, and thus, an overlapping area 1609b is formed. As shown in FIG. 11B, the overlapping area 1609b is continuously displayed even after the overlapping of the area 1607a and the area 1607b has been cancelled. However, the overlapping area 1609b is reduced after the overlapping has been cancelled, and becomes an area having a given width along the right end part of the area 1607a.

Figure 12A:
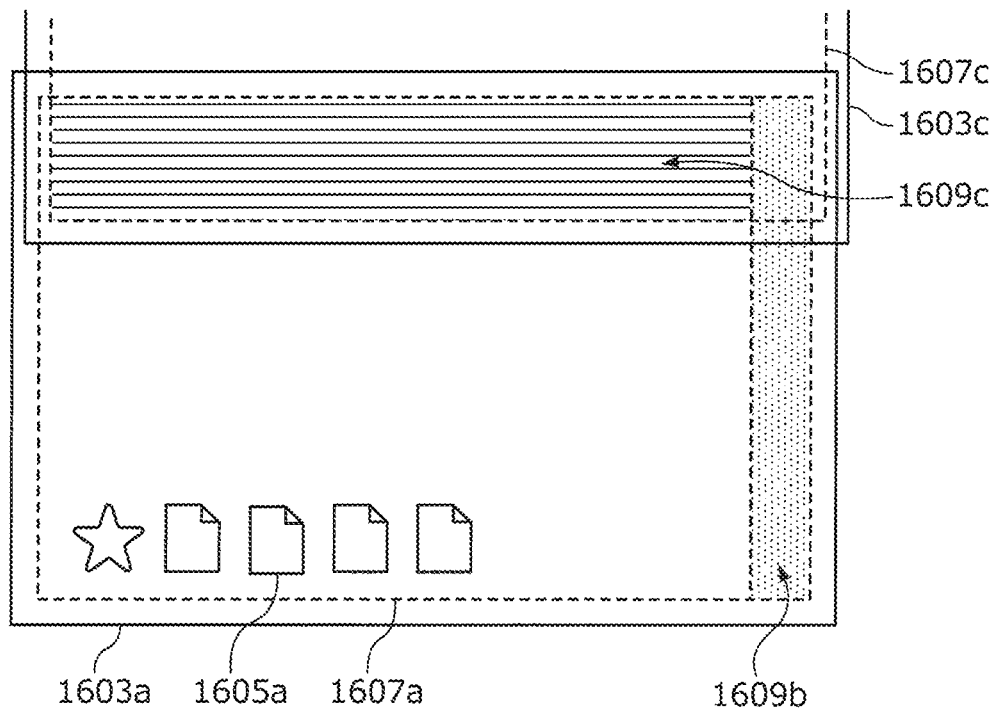
FIG. 12A is a diagram showing the fourth modified example according to the first embodiment of the present disclosure.
Figure 12B:
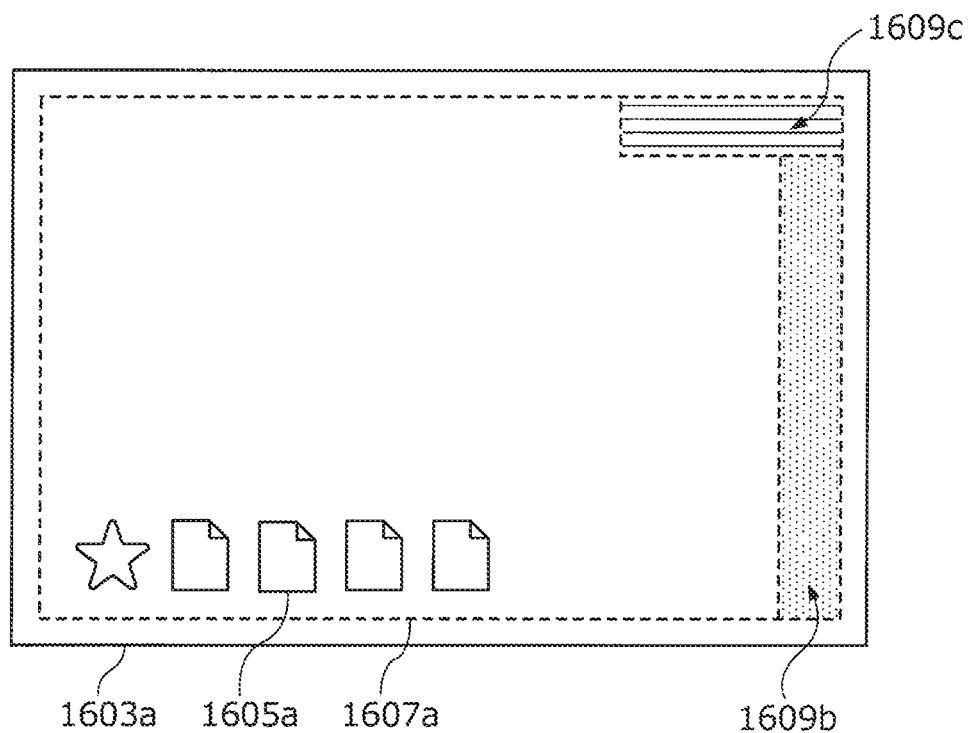
FIG. 12B is a diagram showing the fourth modified example according to the first embodiment of the present disclosure.

Further, in the example shown in FIG. 12A, the upper end part of the area 1607a overlaps with the area 1607c, and thus, an overlapping area 1609c is formed. As shown in FIG. 12B, the overlapping area 1609c is continuously displayed even after the overlapping of the area 1607a and the area 1607c has been cancelled. However, the overlapping area 1609c is reduced after the overlapping has been cancelled, and becomes an area having a given width disposed continuously with the overlapping area 1609b at the upper right part of the area 1607a.

Figure 13A:
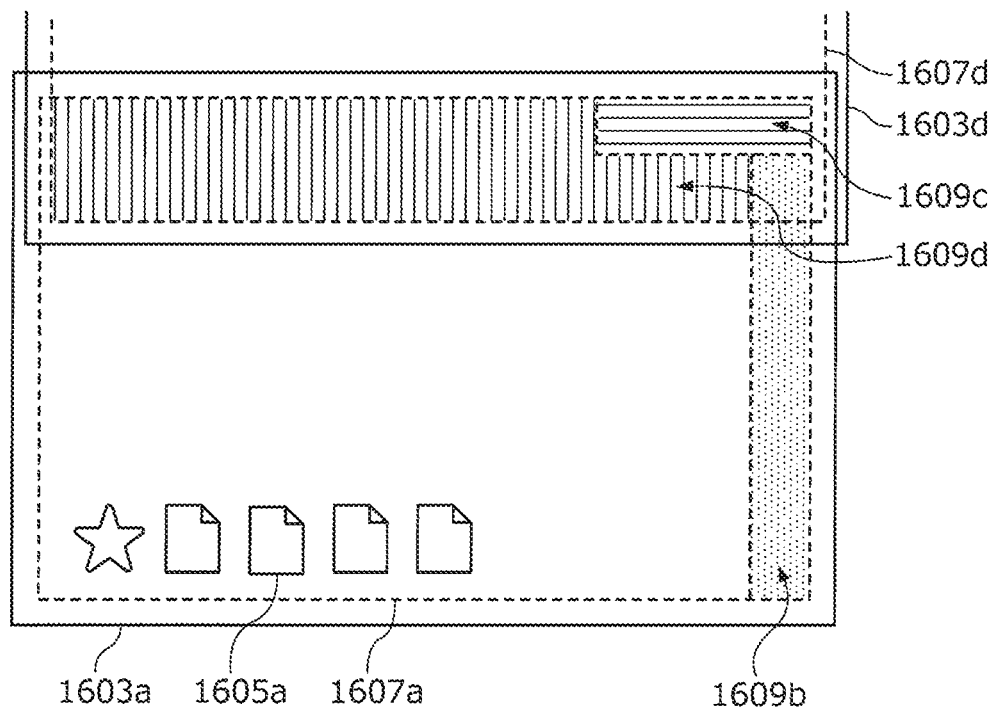
FIG. 13A is a diagram showing the fourth modified example according to the first embodiment of the present disclosure.
Figure 13B:
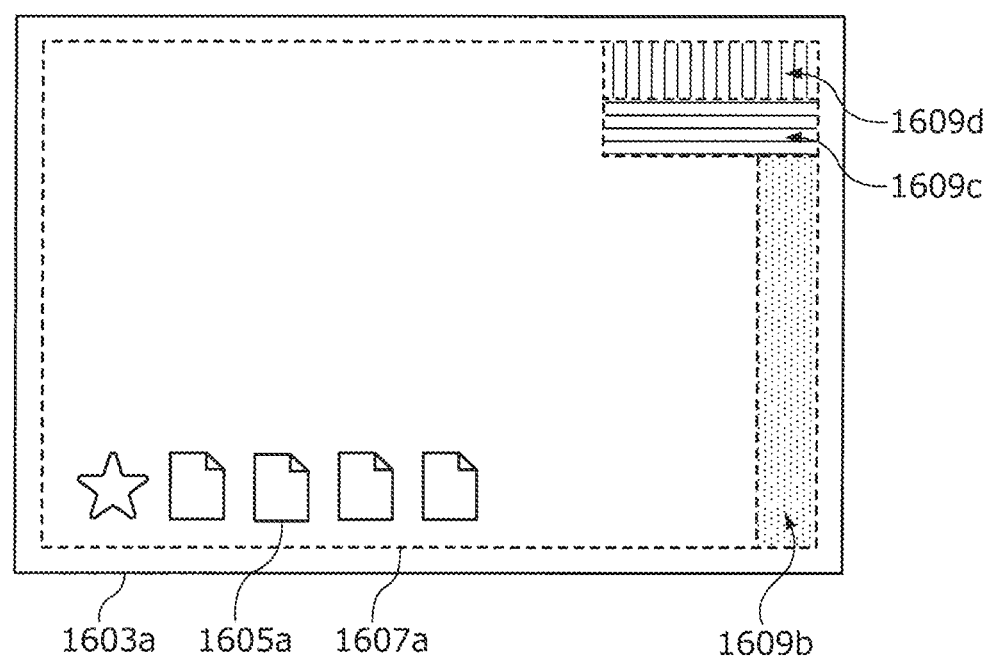
FIG. 13B is a diagram showing the fourth modified example according to the first embodiment of the present disclosure.

Still further, in the example shown in FIG. 13A, the upper end part of the area 1607a overlaps with the area 1607d this time, and thus, an overlapping area 1609d is formed. As shown in FIG. 13B, the overlapping area 1609d is continuously displayed even after the overlapping of the area 1607a and the area 1607d has been cancelled. However, the overlapping area 1609d is also reduced after the overlapping has been cancelled, and becomes an area having a given width disposed continuously with the overlapping area 1609b at the upper right part of the area 1607a. As shown in the figure, the overlapping area 1609d is disposed in a manner that the overlapping area 1609d aligns with the overlapping area 1609c which has already been disposed at the upper right part of the area 1607a.

In the state shown in FIG. 13B, that is, in the state in which the area 1607a has been sequentially overlapped with the areas 1607b to 1607d and then all the overlappings have been cancelled, the overlapping areas 1609b to 1609d are displayed in the minimized sizes in the area 1607a. In this state, it is not easy to dispose an icon 1605 in each of the overlapping areas 1609. Consequently, in order for a user to dispose the icon 1605 in the overlapping area 1609, the user enlarges the target overlapping area 1609.

Figure 14A:
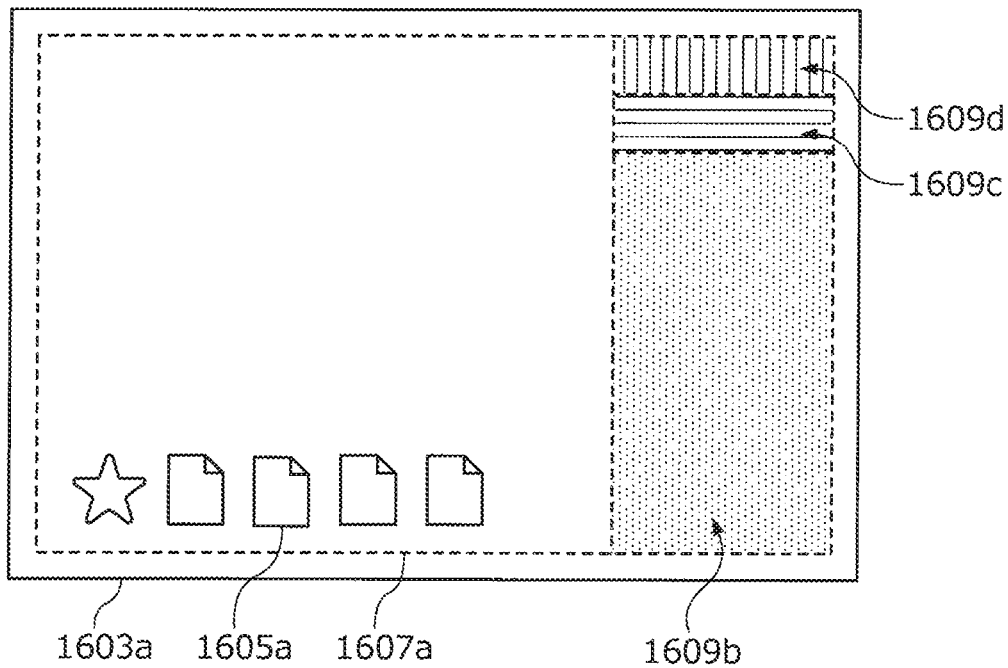
FIG. 14A is a diagram showing the fourth modified example according to the first embodiment of the present disclosure.
Figure 14B:
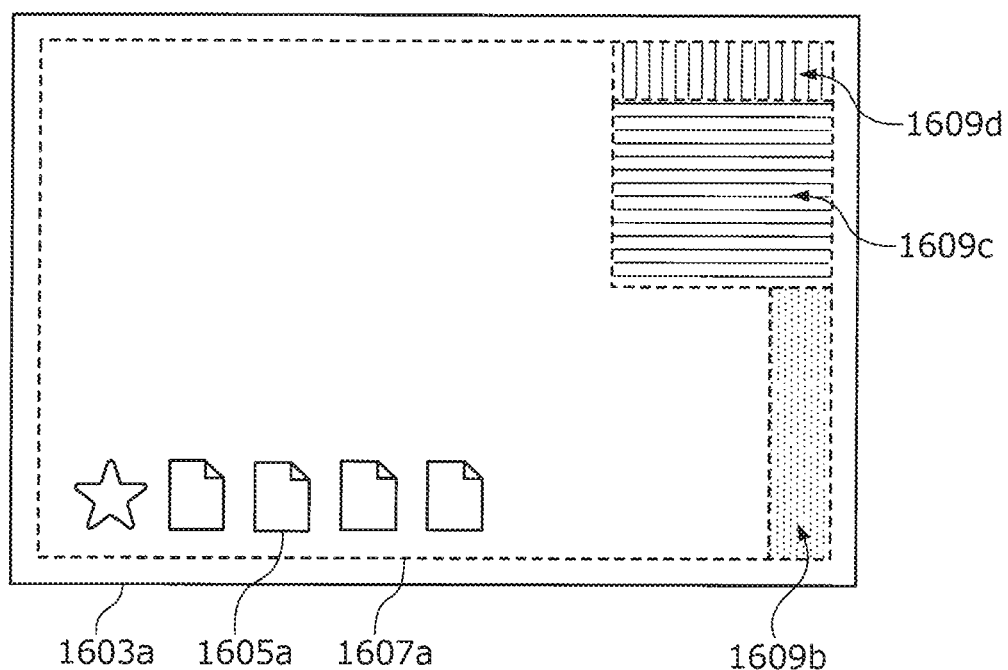
FIG. 14B is a diagram showing the fourth modified example according to the first embodiment of the present disclosure.
Figure 14C:
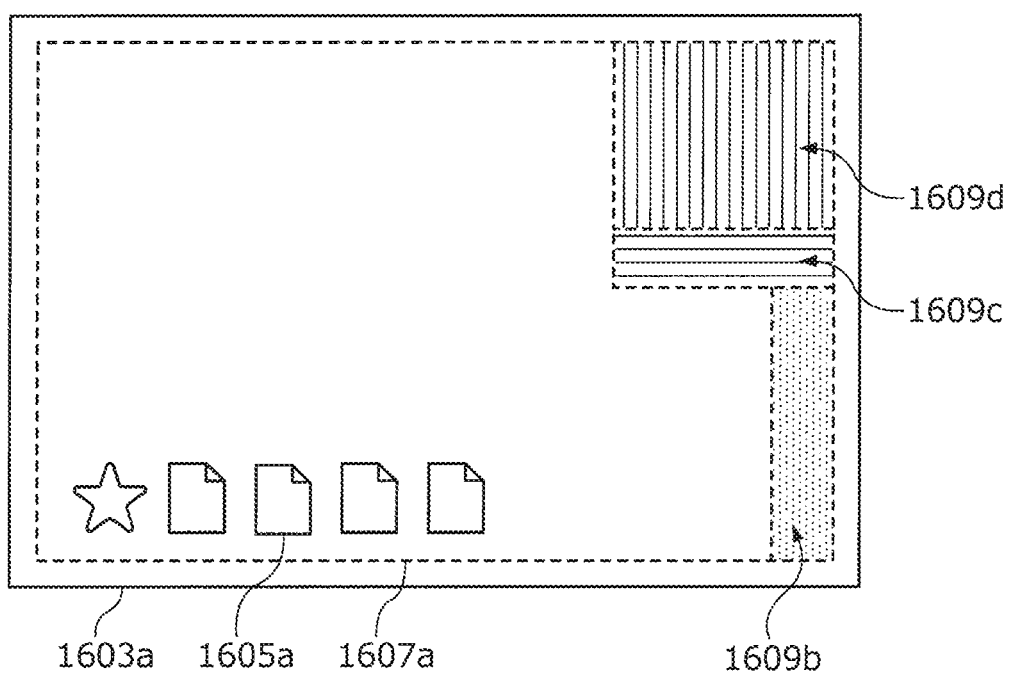
FIG. 14C is a diagram showing the fourth modified example according to the first embodiment of the present disclosure.
Figure 15A:
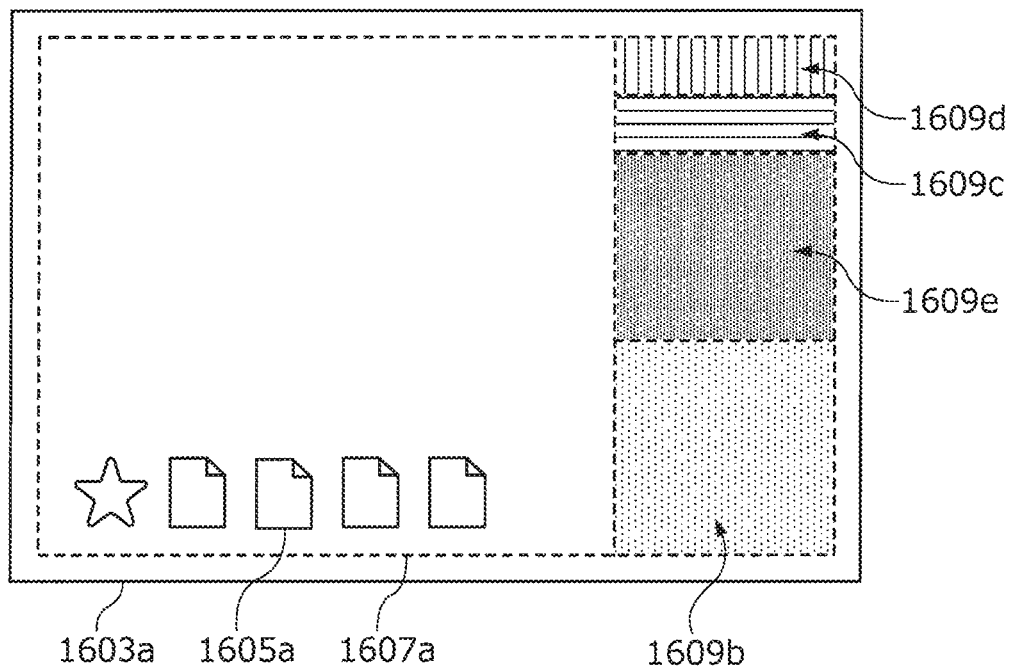
FIG. 15A is a diagram showing the fourth modified example according to the first embodiment of the present disclosure.
Figure 15B:
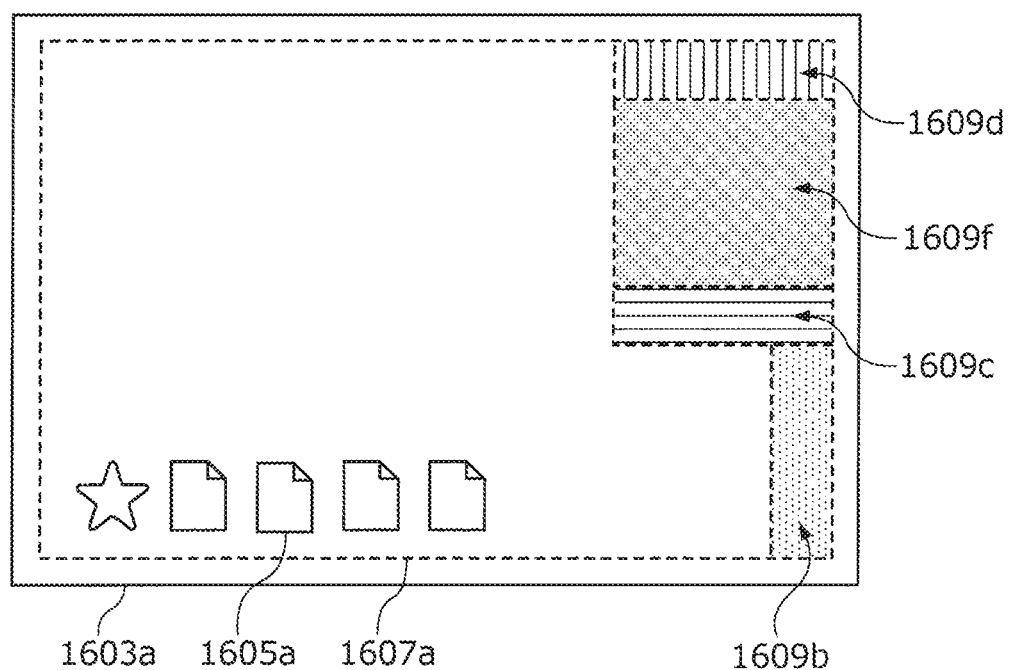
FIG. 15B is a diagram showing the fourth modified example according to the first embodiment of the present disclosure.

To be more specific, in the example shown in FIG. 14A, the user intends to dispose the icon 1605 in the overlapping area 1609b and enlarges the overlapping area 1609b. The enlargement of the overlapping area 1609 may be executed, in the same manner as the example shown in FIGS. 10A and 10B for example, by dragging or tapping operation on the overlapping area 1609. In the same manner as the example of FIG. 14A, in the example shown in FIG. 14B, the overlapping area 1609c is enlarged. In the example shown in FIG. 14C, the overlapping area 1609d is enlarged.

In the present modified example, in addition to the enlargement of the minimized overlapping area 1609 as described above, the operation acquisition part 112 may acquire a user operation for generating a new overlapping area 1609 by selecting multiple minimized overlapping areas 1609 and further overlapping those overlapping areas 1609. For example, in the example shown in FIG. 15A, the overlapping area 1609b and the overlapping area 1609c are simultaneously or sequentially selected with an operation through the touch panel 130, and the display controller 111 causes those areas to be overlapped and a new overlapping area 1609e to be displayed. Further, in the example shown in FIG. 15B, the overlapping area 1609c and the overlapping area 1609d are simultaneously or sequentially selected with an operation through the touch panel 130, and the display controller 111 causes those areas to be overlapped and a new overlapping area 1609f to be displayed.

Note that the examples shown in FIGS. 11A, 11B, 12A, 12B, 13A, 13B, 14A, 14B, 14C, 15A, and 15B are not limited to the case of displaying four projections 1603, and is also applicable to the case of displaying three, or five or more projections 1603, for example. Further, the examples shown in FIGS. 11A, 11B, 12A, 12B, 13A, 13B, 14A, 14B, 14C, 15A, and 15B may also be useful for the case of sharing content itself corresponding to an icon 1605 disposed in the overlapping area 1609 between users.

In the first embodiment of the present disclosure described above, the overlapping area 1609 is formed by overlapping areas 1607 each projected by the projector 160. With the movement of icons 1605 disposed in areas 1607 to the overlapping area 1609, the sharing of metadata between pieces of content corresponding to the icons 1605 becomes possible. The icons 1605, the areas 1607, and the overlapping area 1609 are displayed on the projection plane 1601, which the users who attempt to share metadata can visually recognize in common. Accordingly, the sharing of metadata of content can be achieved with an intuitive operation, like arranging and exchanging pieces of content (such as photographs) on the table.

2. Second Embodiment

A second embodiment of the present disclosure includes a configuration for achieving sharing of metadata of content in the same manner as the first embodiment using a display instead of a projector.

2-1. Device Configuration

Figure 16:
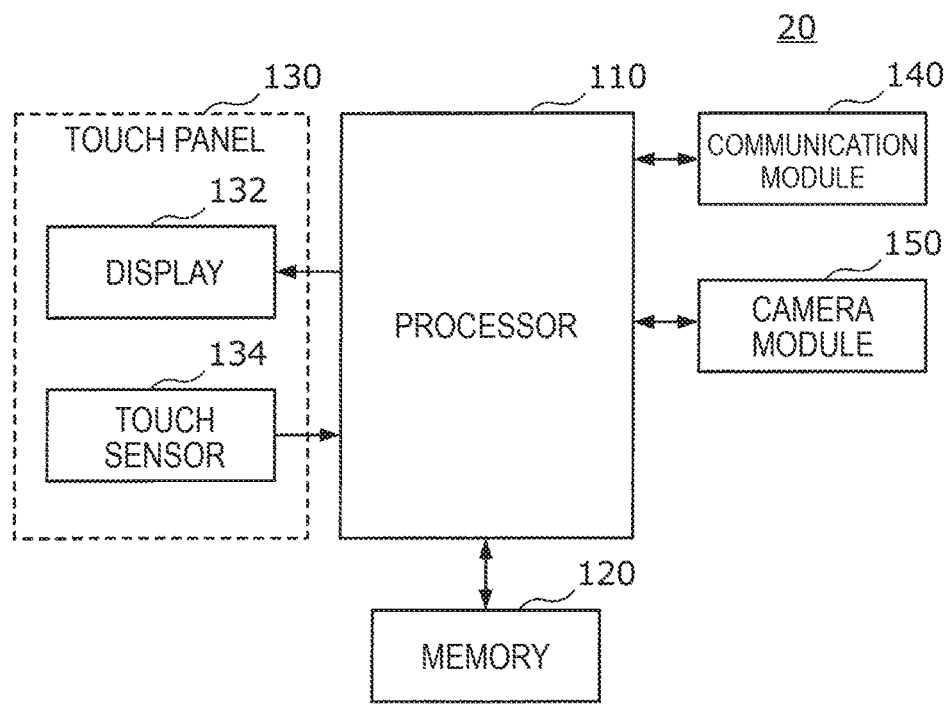
FIG. 16 is a block diagram showing a schematic device configuration of a system according to a second embodiment of the present disclosure.

FIG. 16 is a block diagram showing a schematic device configuration of a system according to the second embodiment of the present disclosure. Referring to FIG. 16, a system 20 includes a processor 110, memory 120, a touch panel 130, a communication module 140, and a camera module 150. In the same manner as the system 10 according to the first embodiment described above, the system 20 may be achieved by including one or more information processing apparatuses.

Note that, although the system 20 according to the present embodiment differs from the system 10 according to the first embodiment in that the system 20 does not necessarily include a projector, other parts such as the system implementation example and the functions of each structural element are the same as the system 10. Therefore, the detailed explanation of the other parts will be omitted.

2-2. Display Example

Figure 17:
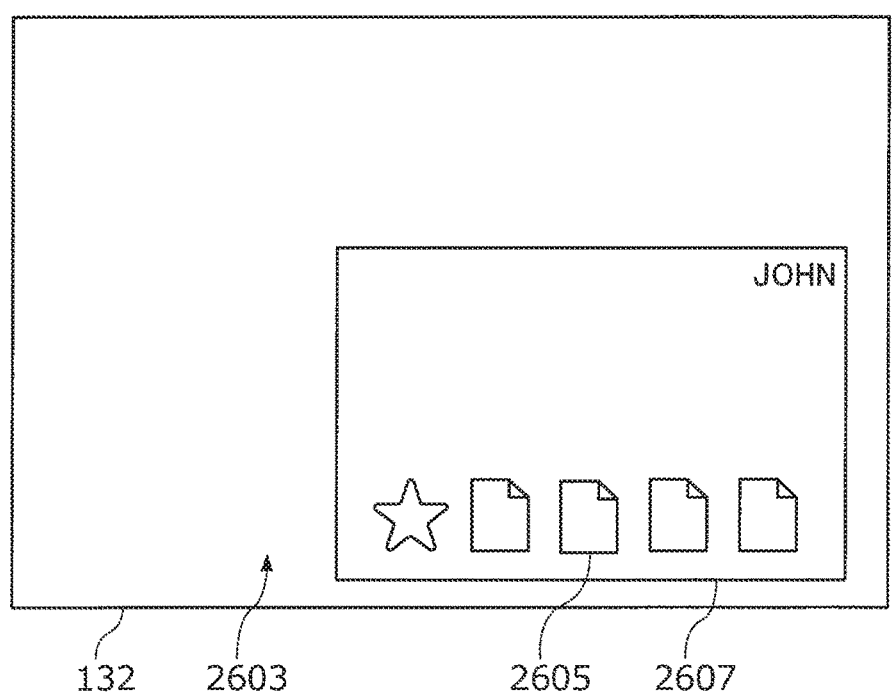
FIG. 17 is a diagram showing a first display example according to the second embodiment of the present disclosure.

FIG. 17 is a diagram showing a first display example according to the second embodiment of the present disclosure. Referring to FIG. 17, in the present embodiment, a screen 2603 is displayed on a display 132 included in the touch panel 130 of the system 20. The screen 2603 includes an area 2607, and an icon 2605 is disposed within the area 2607.

Here, for example, the screen 2603 may be a screen expressing what is called augmented reality (AR) in which a virtual image is overlaid on a captured image of a real space provided by the camera module 150. In this case, the projection 1603 according to the first embodiment may be said to be expressed virtually in the display 132. For example, a user can move the area 2607 within the screen 2603 with respect to the real space by changing the position and the angle of the camera module 150. Further, the user may also be capable of moving or changing the shape of the area 2607 within the screen 2603 by performing a drag operation or the like in the area 2607 through the touch panel 130.

Alternatively, the screen 2603 may be a screen expressing a virtual space. In this case, the area 2607 may be displayed independently of the real space surrounding the user. Accordingly, as the example shown in FIG. 17, the area 2607 which is planar and faces the user may be displayed. In this case, the user can move or change the shape of the area 2607 within the screen 2603 by performing a drag operation or the like in the area 2607 through the touch panel 130.

Figure 18:
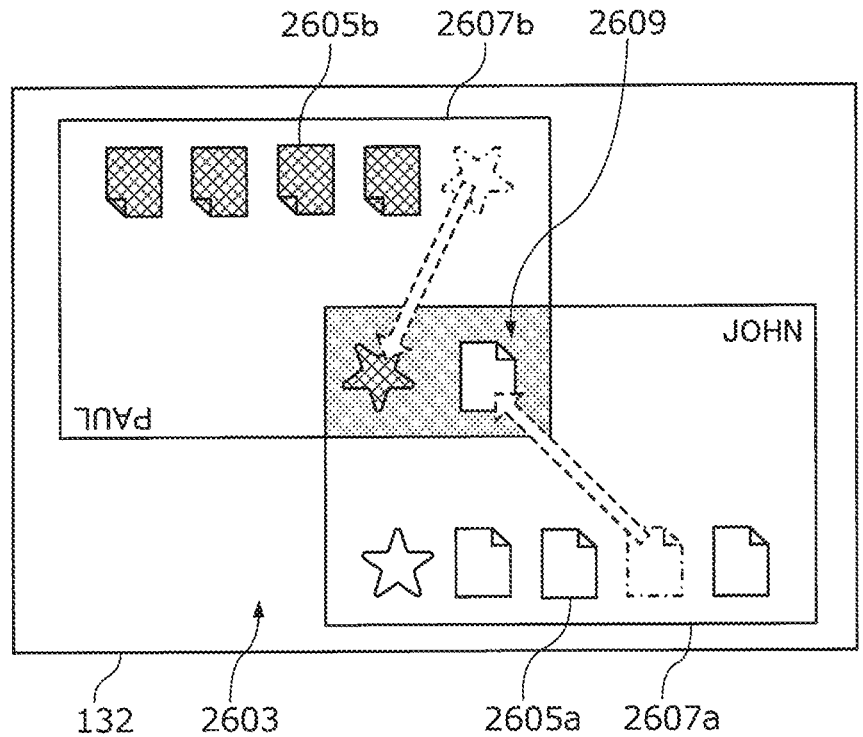
FIG. 18 is a diagram showing a second display example according to the second embodiment of the present disclosure.

FIG. 18 is a diagram showing a second display example according to the second embodiment of the present disclosure. In the example shown in FIG. 18, two areas 2607a and 2607b are displayed on the screen 2603, and icons 2605a and 2605b are disposed in the respective areas. Here, an icon 2605a corresponds to content held by a system 20A including the display 132 on which the screen 2603 is displayed. On the other hand, an icon 2605b corresponds to content held by a system 20B which is different from the system 20A.

Users (users A and B) of the respective systems 20A and 20B can move or change the shapes of the areas 2607 within the screens 2603 displayed by the respective systems 20A and 20B by changing the positions and the angles of the camera modules 150 and performing drag operations or the like in the areas 2607 through the touch panels 130. Accordingly, in the case where the areas 2607a and 2607b overlap with each other, an overlapping area 2609 is generated as the example shown in FIG. 18. When the users A and B moves the icons 2605a and 2605b displayed in the areas 2607a and 2607b, respectively, to the overlapping area 2609 by operations through the touch panels 130, the sharing processing of metadata between pieces of content corresponding to the respective icons 2605a and 2605b is executed.

2-3. Functional Configuration

Figure 19:
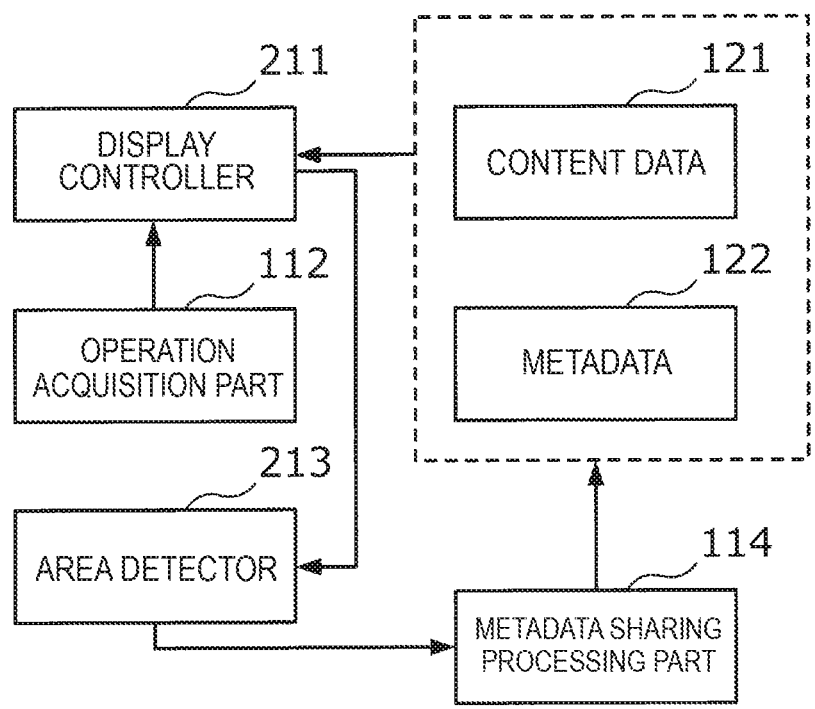
FIG. 19 is a block diagram showing a schematic functional configuration of a system according to the second embodiment of the present disclosure.

FIG. 19 is a block diagram showing a schematic functional configuration of a system according to the second embodiment of the present disclosure. Referring to FIG. 19, in the present embodiment, the processor 110 included in the system 20 achieves each of the functions of a display controller 211, an operation acquisition part 112, an area detector 213, and a metadata sharing processing part 114. Further, in the present embodiment, the memory 120 included in the system 20 stores content data 121 and metadata 122.

Note that, of the functional configuration described above, the parts other than the display controller 211 and the area detector 213 are the same as those described in the first embodiment, and hence, the detailed explanation of the some part will be omitted. Note that, although the case of the system 20A in the display example described above is explained as an example in the description below, the functional configuration of the system 20B is also the same.

The display controller 211 controls the display 132 and causes the area 2607a (first area) in which the icon 2605a (first icon) is disposed to be displayed on the screen 2603. The icon 2605a corresponds to content stored in the memory 120 as the content data 121. The type of the content may be any, such as a still image, a video, an audio, or a document. The icon 2605a may be displayed in various shapes in accordance with the type of the content and with whether the content is a favorite.

As described in the above display examples, the screen 2603 caused to be displayed by the display controller 211 in the present embodiment includes the area 2607a in which the icon 2605a corresponding to content held by the system 20A is disposed and the area 2607b (second area) in which the icon 2605b (second icon) corresponding to content held by the system 20B is disposed. While the area 2607a and the icon 2605a are moved or subjected to shape-change in accordance with an operation acquired through the touch panel 130 in the system 20A, the area 2607b and the icon 2605b are moved or subjected to shape-change by an operation of the user of the system 20B.

To be more specific, for example, regarding the area 2607a and the icon 2605a, the display controller 211 of the system 20A determines initial display positions and shapes in accordance with a program stored in the memory 120, and also causes the area 2607a and/or the icon 2605a to be moved or to be subjected to shape-change in accordance with a user operation through the touch panel 130. The display controller 211 causes the area 2607a and the icon 2605a to be displayed on the display 132 in the thus set display positions and shapes.

On the other hand, regarding the area 2607b and icon 2605b, the display controller 211 of the system 20A receives information related to display positions and shapes from the system 20B through the communication module 140. In the system 20B, the display positions and shapes of the area 2607b and the icon 2605b are determined by a user operation through the touch panel 130. The display controller 211 causes the area 2607b and the icon 2605b to be displayed on the display 132 in accordance with the received information. Further, in order to cause the area 2607a and the icon 2605a to be displayed also on the display 132 of the system 20B, the display controller 211 transmits the information related to the display positions and shapes to the system 20B through the communication module 140.

The area detector 213 detects the overlapping area 2609, the overlapping area 2609 being the area in which the area 2607a (first area) caused to be displayed by the display controller 211 overlaps with the area 2607b (second area), the area 2607b being present within the screen 2603 (display surface) and being different from the area 2607a. In the present embodiment, as described above, the display controller 211 sets the display positions and shapes in the screen 2603 for both of the areas 2607a and 2607b. Accordingly, the area detector 213 can detect the overlapping area 2609 on the basis of virtual position information within the screen of the areas 2607a and 2607b provided by the display controller 211.

2-4. Modified Example

Compared to the first embodiment, the configuration of the present embodiment is approximately the same as the first embodiment apart from the fact that the display of the projection 1603 using the projector 160 on the real projection plane 1601 is changed to the display of the virtual screen 2603 on the display 132. Accordingly, for the configuration of the embodiment of the parts other than the above-mentioned part and the modified example, the description of the first embodiment may be applied in the same manner. Hereinafter, a modified example that is different from that of the first embodiment will be described.

Figure 20:
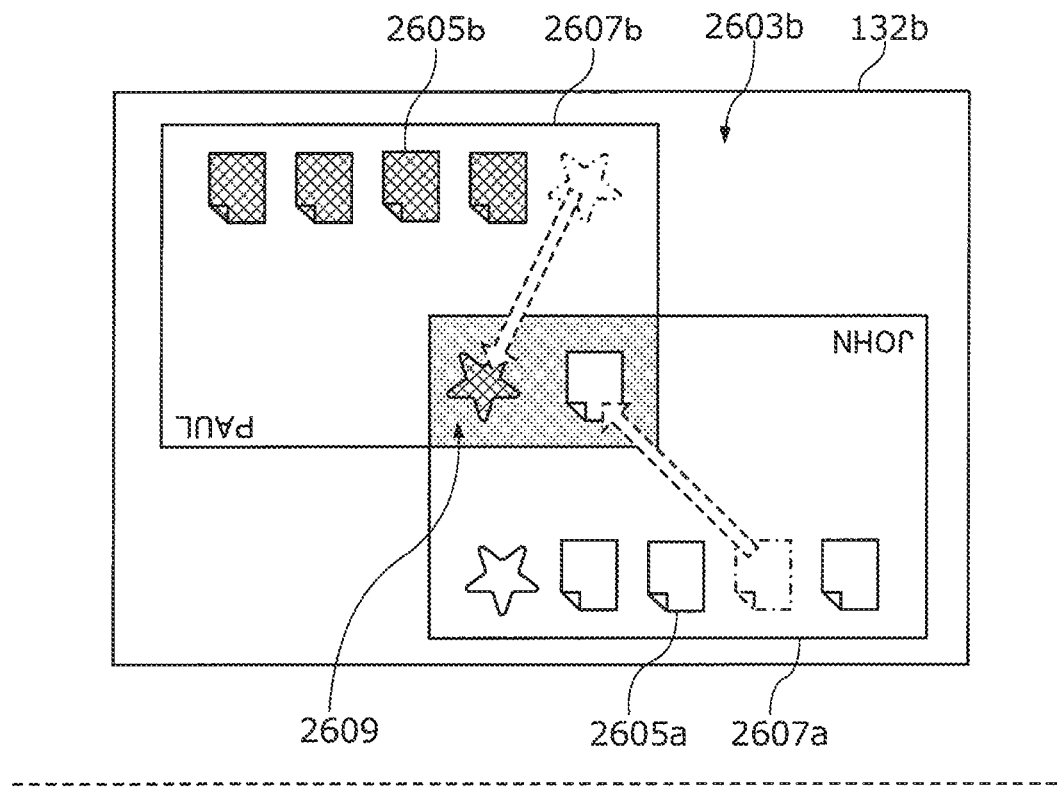
FIG. 20 is a diagram showing a modified example according to the second embodiment of the present disclosure.
Figure 20:
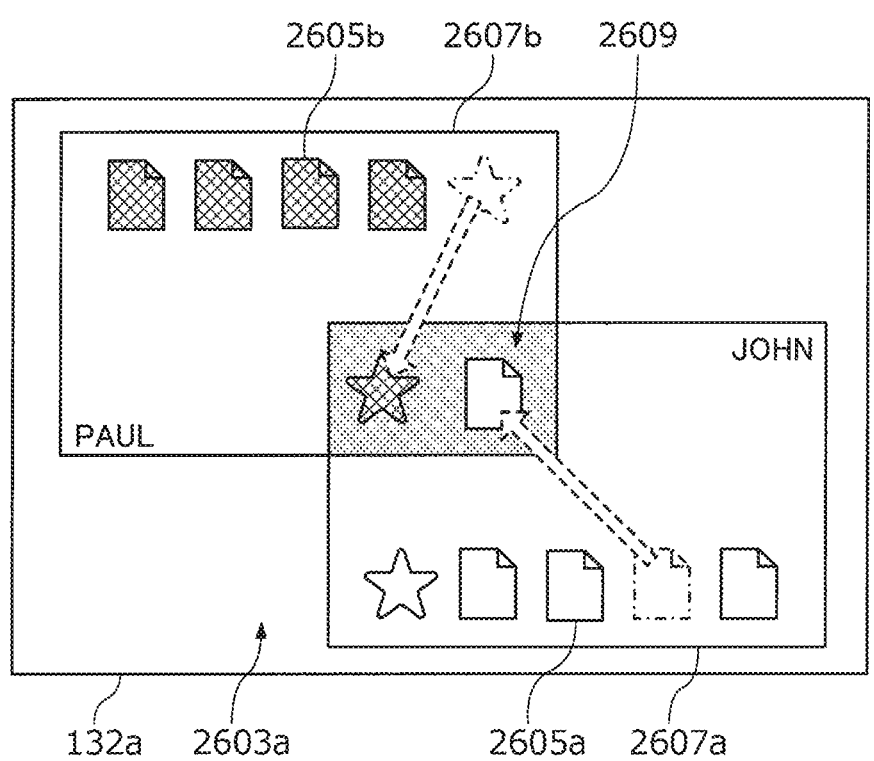

FIG. 20 is a diagram showing a modified example according to the second embodiment of the present disclosure. Referring to FIG. 20, in each of a screen 2603*a* displayed on a display 132*a* of the system 20A and a screen 2603*b* displayed on a display 132*b* of the system 20B, two areas 2607*a* and 2607*b* and icons 2605*a* and 2605*b* disposed in the respective areas are displayed. The areas 2607*a* and 2607*b* are overlapped in the overlapping area 2609. Further, the area 2607*a* is displayed in the front side on the display 132*a*, and the area 2607*b* is displayed in the front side on the display 132*b*.

In this case, in the screen 2603*a*, the icon 2605*b* disposed in the area 2607*b* faces toward the area 2607*a*, and the direction of the icon 2605*b* is consistent with the direction of the icon 2605*a*. On the other hand, in the screen 2603*b*, the icon 2605*a* disposed in the area 2607*a* faces toward the area 2607*b*, and the direction of the icon 2605*a* is consistent with the direction of the icon 2605*b*. Note that the direction in which each icon 2605 faces is easily understood by referring to the direction in which the star-shaped icon shown in the figure faces, for example.

In this way, in the present modified example, the directions of the icons 2605 disposed in the multiple areas 2607 included in the screen 2603 are changed in accordance with the direction in which the screen 2603 is observed. To be more specific, for example, in the case where the display controller 211 of the system 20A causes the icon 2605*b* to be displayed on the screen 2603*a* in accordance with information received through the communication module 140 from the system 20B, the display controller 211 of the system 20A changes the direction of the icon 2605*b* so as to be consistent with the direction of the icon 2605*a*.

Note that, although the figures of the present embodiment shows as examples of the display 132, a display of a flat plate type, embodiments of the present disclosure are not limited to such examples. For example, the display 132 may be a head-mounted type.

In the second embodiment of the present disclosure described above, the icon 2605, the area 2607, and the overlapping area 2609 are virtually displayed in the screen 2603 of the display 132, and thus, the sharing of metadata between pieces of content can be achieved with an intuitive operation in the same manner as the first embodiment, even in the case where a projector is not included in the system 20 or there is no projection plane for displaying multiple areas as projections, for example. Further, for example, in the case where the screen 2603 is a screen expressing a virtual space, the sharing of metadata of content can be achieved with an intuitive operation between users who are not in the same space.

3. Third Embodiment

A third embodiment of the present disclosure includes a configuration of a projector that can be used in the first embodiment described above, for example. Note that the example of the present embodiment is achievable independently of the first embodiment (and the second embodiment).

3-1. Device Configuration

Figure 21:
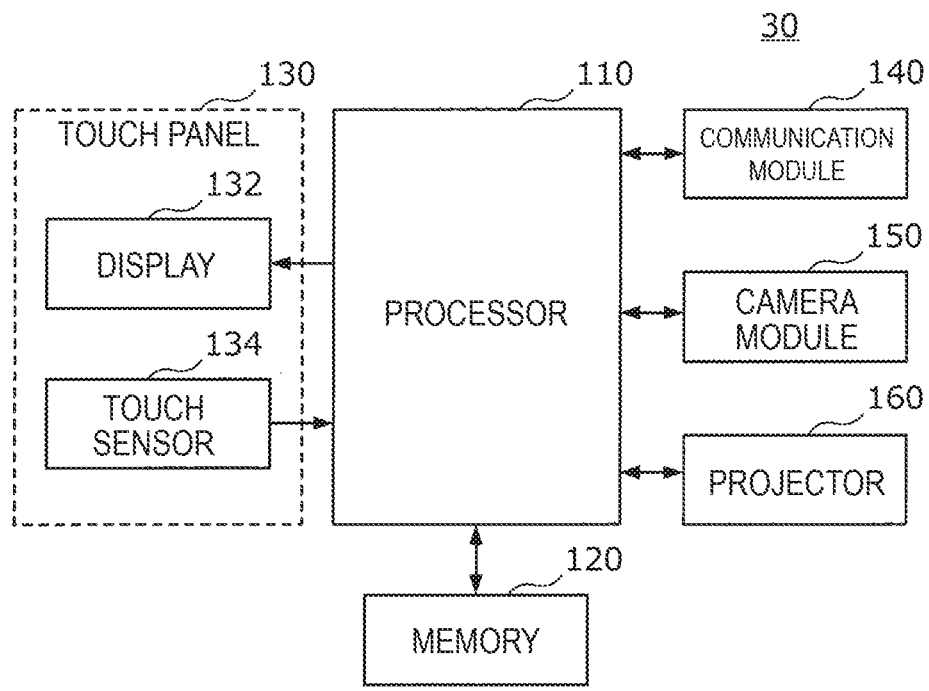
FIG. 21 is a block diagram showing a schematic device configuration of a system according to a third embodiment of the present disclosure.

FIG. 21 is a block diagram showing a schematic device configuration of a system according to the third embodiment of the present disclosure. Referring to FIG. 21, a system 30 includes a processor 110, memory 120, a touch panel 130, a communication module 140, a camera module 150, and a projector 160. In the same manner as the system 10 according to the first embodiment described above, the system 30 may be achieved by including one or more information processing apparatuses.

Note that the system 30 according to the present embodiment has the same device configuration as the system 10 according to the first embodiment. Therefore, the detailed explanation of structural elements of the device configuration will be omitted. The difference between the present embodiment and the first embodiment will become clear with the following description of the functional configuration. Note that the relationship between the camera module 150 and the projector 160 of the present embodiment is the same as that described in the first embodiment with reference to FIG. 2.

3-2. Functional Configuration

Figure 22:
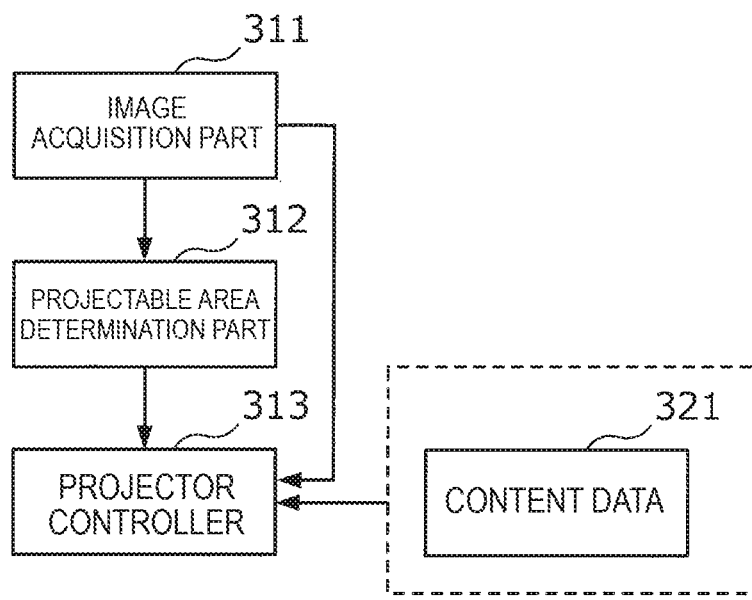
FIG. 22 is a block diagram showing a schematic functional configuration of a system according to the third embodiment of the present disclosure.

FIG. 22 is a block diagram showing a schematic functional configuration of a system according to the third embodiment of the present disclosure. Referring to FIG. 22, in the present embodiment, the processor 110 included in the system 30 achieves each of the functions of an image acquisition part 311, a projectable area determination part 312, and a projector controller 313. Further, in the present embodiment, the memory 120 included in the system 30 stores content data 321. Note that the functions may be achieved independently, or may be achieved with the functions described in the first embodiment, for example.

The image acquisition part 311 acquires a captured image including at least a part of a pattern projected by the projector 160 on the projection plane 1601 from the camera module 150. In the present embodiment, with the function of the projector controller 313 to be described later, the projector 160 project a given pattern on the projection plane 1601 at least temporarily. The image acquisition part 311 acquires a captured image including at least a part of a pattern included in a projection 1603 on the projection plane 1601 from the camera module 150. In the present embodiment, the camera module 150 and the projector 160 are disposed such that at least a part of the projection 1603, which is displayed by the projector 160 projecting an image on the projection plane 1601, is included in an angle of view 1501 of the camera module 150. Accordingly, the camera module 150 can acquire a captured image including at least a part of the pattern included in the projection 1603. Note that a specific example of the patterns to be projected will be described later.

Here, projection of a pattern performed by a function of the projector controller 313 will be further described. As will be described later, the projector controller 313 provides the projector 160 with image data in accordance the content data 321, and causes content to be displayed on the projection plane 1601 as the projection 1603. On the other hand, the projector controller 313 projects a given pattern on the projection plane 1601 at the time that the projector 160 starts the projection, for example. The given pattern may be visually recognizable to a user, or is displayed using invisible light such as infrared rays and may not be visually recognizable to the user. Further, the projector controller 313 may project the given pattern on the projection plane 1601 at given intervals, also after the projector 160 has started the display of content. In this way, also in the case where the positional relationship between the projector 160 and the projection plane 1601 changes during the projection or a new object is disposed on the projection plane 1601, for example, the projectable area on the projection plane 1601 can be optimized as will be described later.

The projectable area determination part 312 determines a projectable area on the projection plane 1601 on the basis of the captured image acquired by the image acquisition part 311. The projectable area is an area in which, in the case where the projector 160 projects an image on the projection plane 1601, the image can be visually recognized relatively clearly in the projection 1603. The projectable area is a rectangular area, or a part of the area may be cut out as will be described later. Further, the projectable area may have a shape other than the rectangle. The projectable area determination part 312 changes the size and/or shape of the projectable area depending on whether a captured image having an irregularly projected pattern in a first area within the projection plane 1601 is captured.

For example, unless the first area having the irregularly projected pattern is generated, the projectable area determination part 312 may set as the projectable area an area having the maximum possible size for the projector 160 to project the image on the projection plane 1601. Further, for example, in the case where the first area having an irregularly projected pattern is generated, the projectable area determination part 312 may set a reduced projectable area so as not to include the first area, or may cut out the first area from the projectable area.

Here, there are some causes for the case where the pattern is irregularly projected. For example, in the case where some sort of object is disposed on the projection plane 1601, the projection plane 1601 is not flat at the part (first area), and thus, the pattern is irregularly distorted. In this case, if the image is projected in the first area in which the pattern is irregularly distorted, it is difficult to visually recognize the image clearly on the projection 1603. Accordingly, the projectable area determination part 312 determines the projectable area by excluding the first area. However, in the case where an object disposed on the projection plane 1601 has a certain size and has a flat part on the surface of the object, for example, although the pattern to be projected is irregularly distorted in the first area, the pattern is regularly projected in a second area (flat part) surrounded by the first area. In such a case, the projectable area determination part 312 may set a combination of a first projectable area which does not include the first area and a second projectable area corresponding to the second area as the projectable area.

Note that the irregular distortion of the pattern mentioned in the example described above represents a state in which the shape of the projected pattern changes discontinuously with the surrounding area due to disposition of an object, for example. In contrast, the regular projection represents a state in which the shape of the projected pattern changes continuously with the surrounding area. For example, in the case where the projection 1603 is deformed into a trapezoid or an irregular quadrilateral due to the fact that the projection plane 1601 inclines with respect to an optical axis of the projector 160, for example, although the pattern included in the projection 1603 is deformed when compared to the original shape, since the deformation occurs continuously over the entire pattern, the deformation differs from the irregular distortion of the example described above.

Note that in the present embodiment, since correction processing (such as trapezoid correction) is known technology, the detailed description thereof is omitted, the correction processing being performed in the case where the projection 1603, which is originally a rectangle, is deformed into a trapezoid or an irregular quadrilateral due to the fact that the projection plane 1601 inclines with respect to the optical axis of the projector 160. Accordingly, regarding the description of the shapes of the projection 1603, the projectable area, and the like, there is no description about each of the shapes actually not being a rectangle and being a trapezoid or an irregular quadrilateral, but it is easily understood by those skilled in the art that the present embodiment is also applicable to such a case.

Further, for example, in the case where the texture of the projection plane 1601 is partly changed, in the partly changed part (first area), the texture of the pattern is also irregularly changed due to the fact that the texture of the background of the projection is different. In this case, when an image is projected over the first area and an area other than the first area, it is difficult to visually recognize the image clearly on the projection 1603, since the texture of the background changes in the middle. Accordingly, the projectable area determination part 312 determines the projectable area by excluding the first area. Note that, in the case where the texture itself in the first area of the projection plane 1601 does not make the projection of the image difficult, for example, it is not necessarily difficult to visually recognize the image if the image to be projected is not projected over the first area and an area other than the first area. Consequently, in such a case, the projectable area determination part 312 may set a combination of a first projectable area which does not include the first area and a second projectable area corresponding to the first area as the projectable area.

Note that the irregular change in the texture of the pattern mentioned in the example described above represents a state in which the texture of the projected pattern changes discontinuously with the surrounding area due to the fact that the projection plane 1601 is formed by joining together a table and a wall whose materials and paintings, for example, are different from each other, or due to the fact that a sheet-shaped object, such as paper, is disposed on the projection plane 1601. In contrast, the regular change in the texture represents a state in which the texture of the projected pattern changes continuously with the surrounding area. For example, in the case where the projection plane 1601 is a wooden table or a wooden surface of a wall and a wood grain is observed as the texture, although the textures in the background of the pattern included in the projection 1603 differ from place to place, since the change occurs continuously over the entire pattern, the difference differs from the irregular change in the texture described in the above example.

The projector controller 313 controls the projector 160 in a manner that an image is projected in the projectable area determined by the projectable area determination part 312. To be more specific, for example, the projector controller 313 controls an optical system of the projector 160 and adjusts a magnification of the projection 1603 in accordance with the size of the determined projectable area. Further, for example, the projector controller 313 edits image data to be provided to the projector 160 on the basis of the content data 321 in accordance with the shape of the determined projectable area. For example, in the case where a first area (area in which a pattern is irregularly projected) is cut out from the projectable area, the projector controller 313 edits the image data to be provided to the projector 160 in a manner that the part corresponding to the cut-out first area is a blank. Further, for example, in the case where the projectable area includes a first projectable area and a second projectable area, the projector controller 313 generates pieces of image data corresponding to the two areas, respectively.

Here, for example, as the example described above, in the case where the projectable area determination part 312 determines the first projectable area and the second projectable area the texture of which is different from the texture of the first area, the projector controller 313 may control the projector 160 in a manner that a type of an image projected on the first projectable area is different from a type of an image projected on the second projectable area. For example, in the case where the first projectable area has a pale solid color and the second projectable area has a dark solid color, while a relatively fine image such as text information is visually recognizable in the first projectable area, a relatively rough image such as an icon is visually recognizable in the second area. In such a case, the projector 160 may dispose an image of text information (for example, an article of an e-paper or an e-book) in the first area, and an operation icon (in the case where a GUI is provided by the projector 160 and the camera module 150 or another sensor) for operating the image in the second area.

Further, the projector controller 313 may adjust an amount of information of an image displayed by the projector 160 on the basis of a captured image acquired by the image acquisition part 311. For example, in the case where the camera module 150 and the projector 160 are built in an identical terminal device, or in the case where the camera module 150 and the projector 160 are fixedly externally attached to an identical terminal device, it is considered that the image captured by the camera module 150 is close to the figure of the projection 1603 that the user visually recognizes. Accordingly, in such a case, the projector controller 313 edits image data to be provided to the projector 160 on the basis of the content data 321 in accordance with the size of the pattern in the image captured by the camera module 150. For example, the projector controller 313 measures how a size or an interval of a given figure included in an original image of a pattern projected by the projector 160 changes in an image obtained by the camera module 150 capturing the pattern projected by the projector 160 on the projection plane 1601. The size or the interval in the captured image may be measured in units of pixels, for example.

3-3. Display Example

First Display Example

Figure 23A:
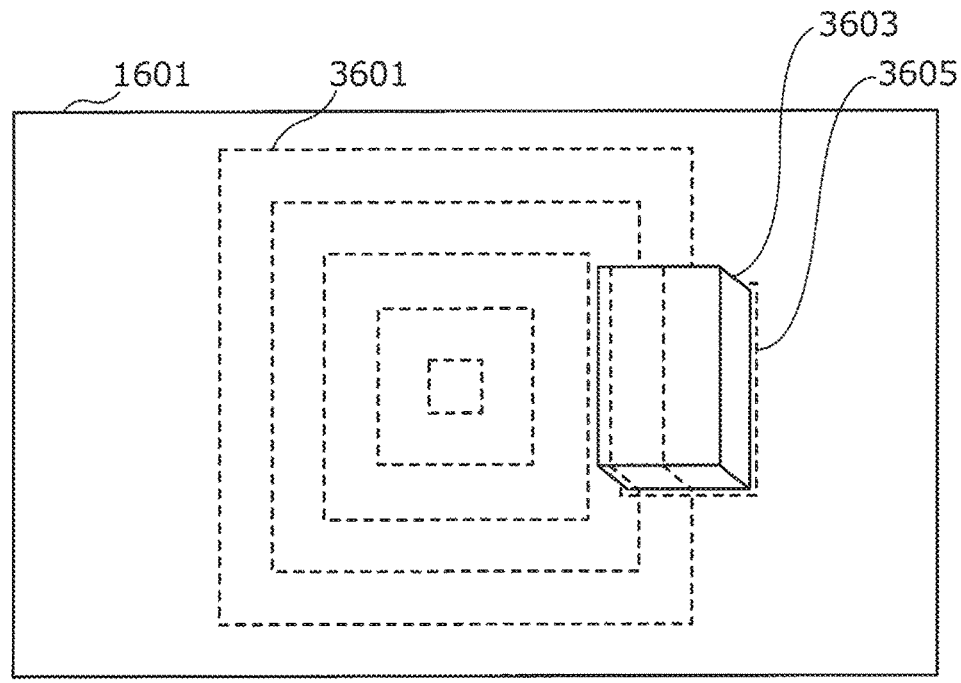
FIG. 23A is a diagram showing a first display example according to the third embodiment of the present disclosure.
Figure 23B:
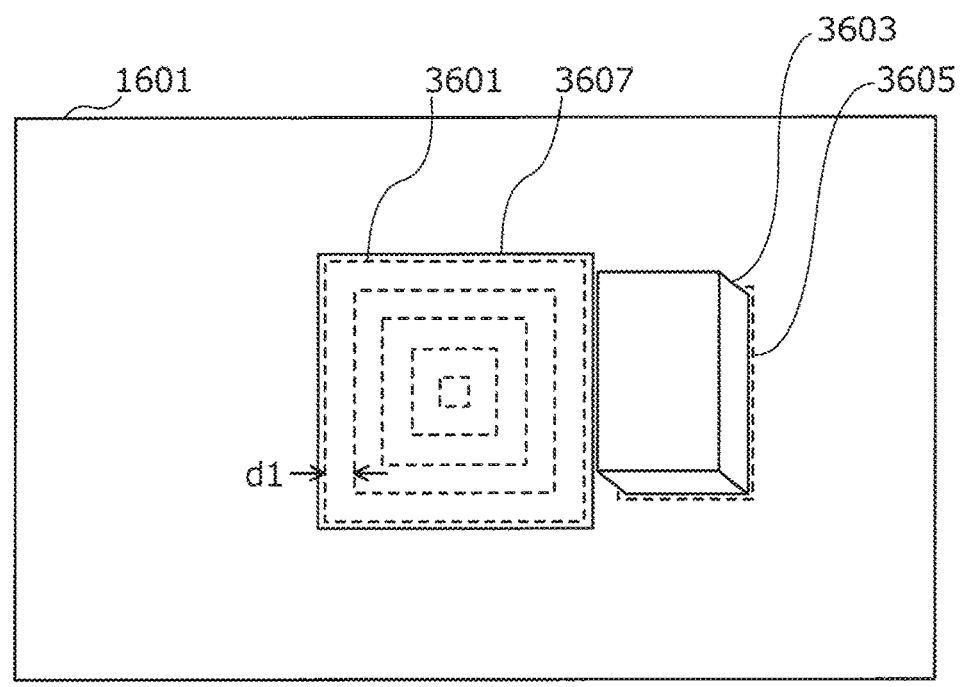
FIG. 23B is a diagram showing the first display example according to the third embodiment of the present disclosure.

FIGS. 23A and 23B are each a diagram showing a first display example according to the third embodiment of the present disclosure. Referring to FIG. 23A, the projector 160 projects a pattern 3601 having concentric rectangles on the projection plane 1601. The pattern 3601 is displayed in a manner that the pattern 3601 is irregularly distorted in an area 3605 (first area) owing to an object 3603 disposed on the projection plane 1601. In such a case, in the system 30, the image acquisition part 311 acquires a captured image including the pattern 3601 which is irregularly distorted in the area 3605 from the camera module 150. Accordingly, as shown in FIG. 23B, the projectable area determination part 312 determines a projectable area 3607 which has been reduced so as not to include the area 3605.

Here, the projector controller 313 may cause the pattern 3601 to be projected again in the reduced projectable area 3607. In this case, the projector controller 313 acquires the captured image including the re-projected pattern 3601 from the camera module 150, and adjusts the amount of information of the projected content image on the basis of an interval dl between rectangles forming the pattern 3601 in the captured image. As an example, the projector controller 313 may adjust the amount of information of the projected content image to the following stages: a stage in which the interval dl on the captured image is 0 to 8 pixels (amount of information is smallest); a stage in which the interval dl on the captured image is 9 to 16 pixels (amount of information is medium); and a stage in which the interval dl on the captured image is 17 pixels or more (amount of information is largest).

Second Display Example

Figure 24A:
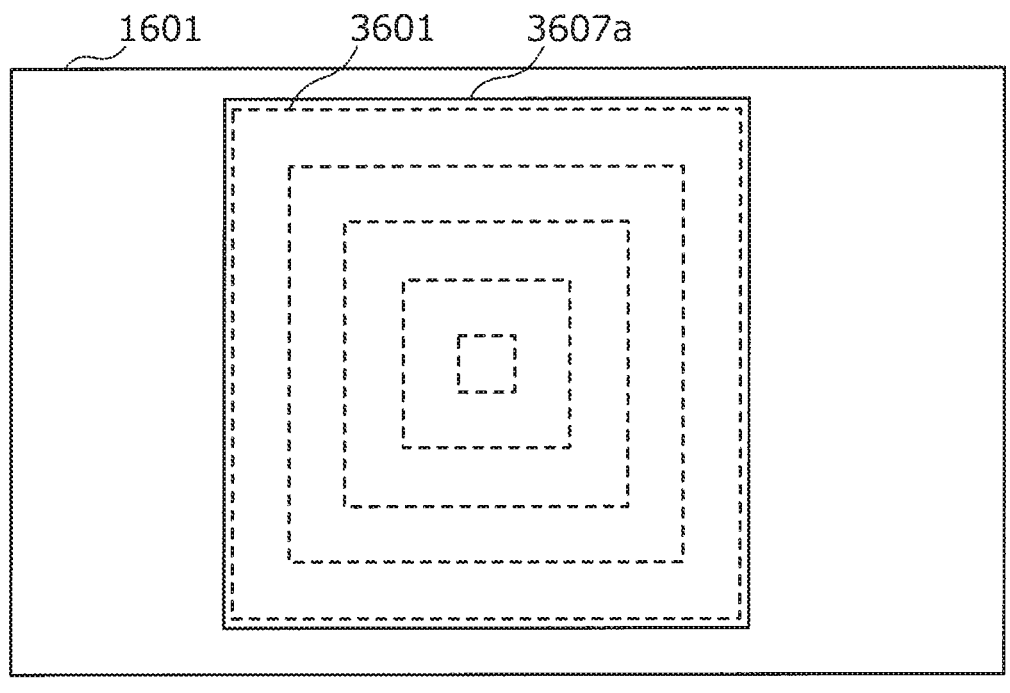
FIG. 24A is a diagram showing a second display example according to the third embodiment of the present disclosure.
Figure 24A:
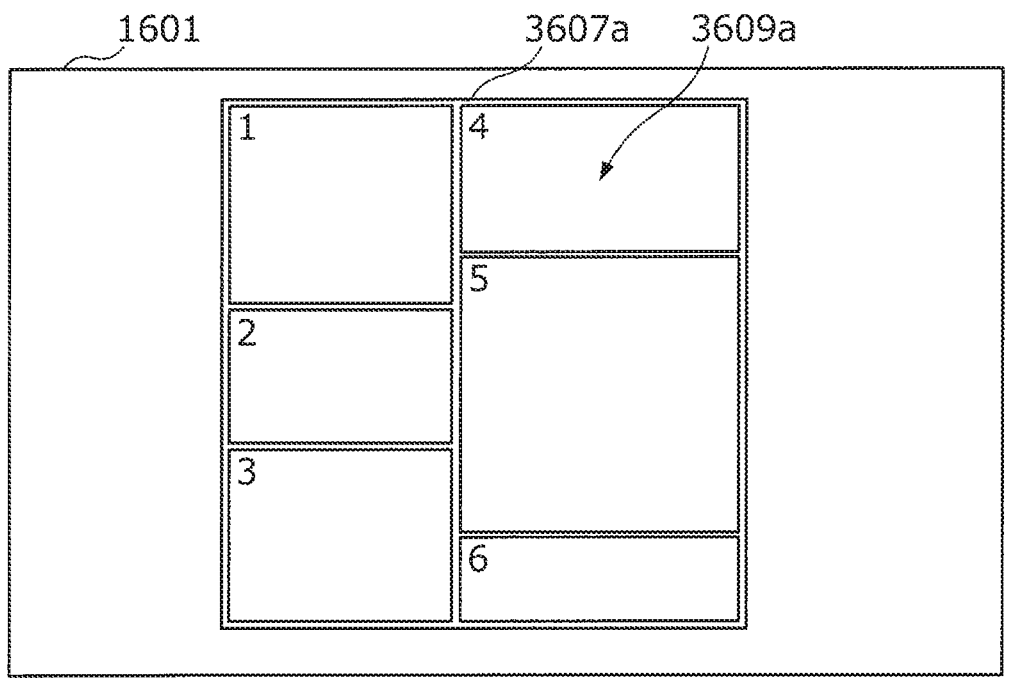
Figure 24B:
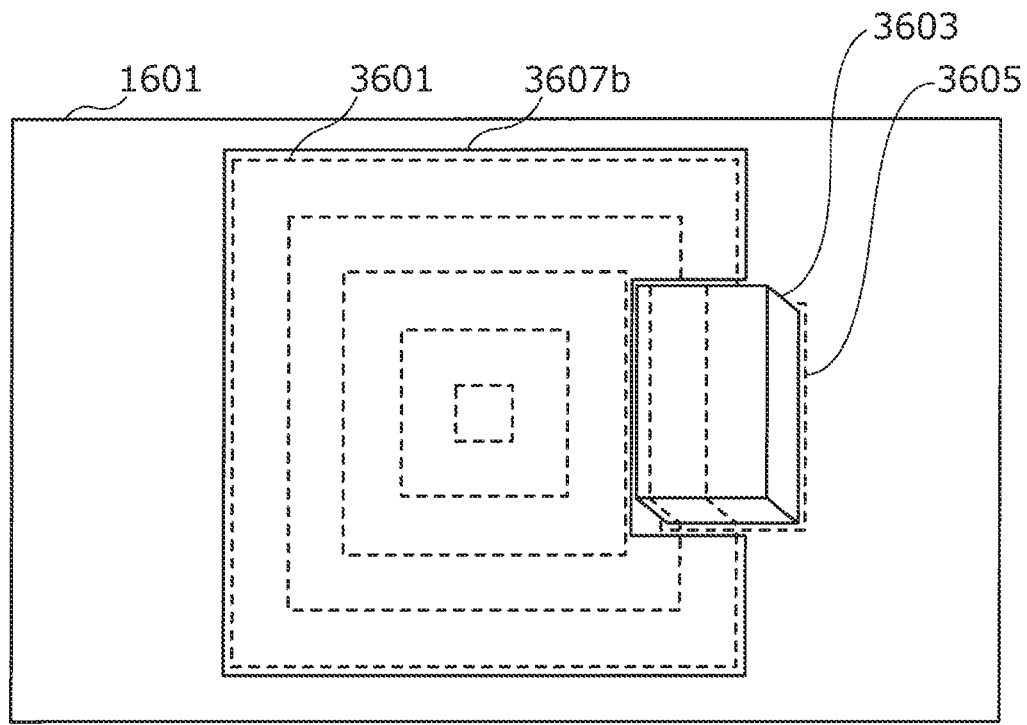
FIG. 24B is a diagram showing the second display example according to the third embodiment of the present disclosure.
Figure 24B:
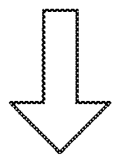
Figure 24B:
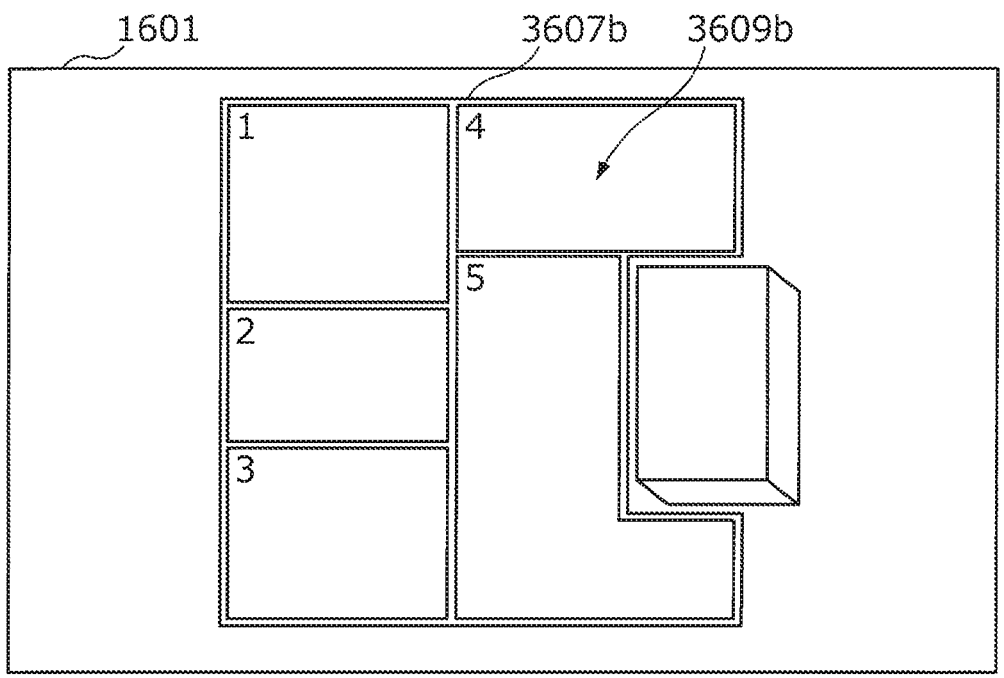
Figure 24C:
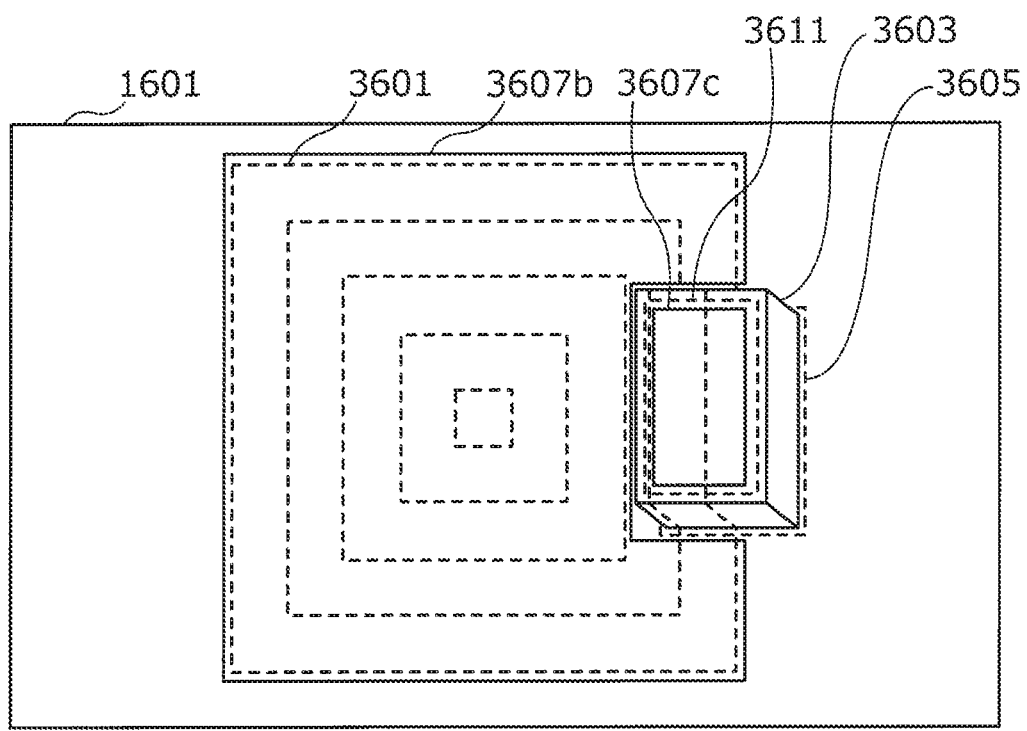
FIG. 24C is a diagram showing the second display example according to the third embodiment of the present disclosure.
Figure 24C:
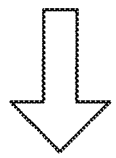
Figure 24C:
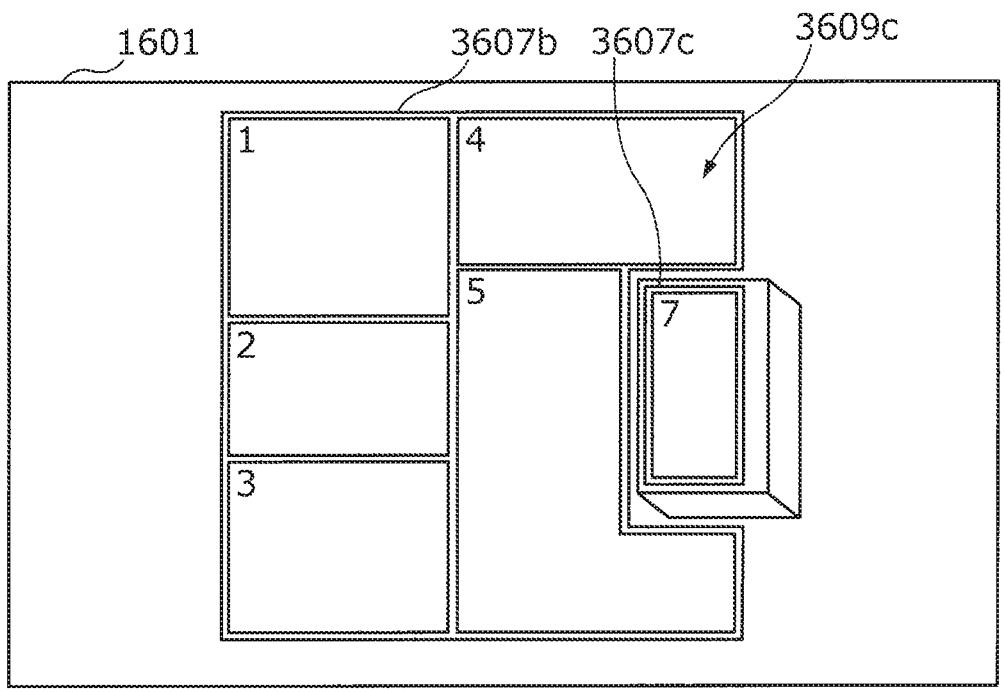

FIGS. 24A, 24B, and 24C are each a diagram showing a second display example according to the third embodiment of the present disclosure. FIG. 24A is an example of a case where no object is disposed on the projection plane 1601. In this case, the pattern 3601 does not have an area with irregular projection. Accordingly, the projectable area determination part 312 sets a maximum possible area in which the projector 160 can project an image on the projection plane 1601 as a projectable area 3607a. The projector controller 313 causes the projectable area 3607a to display an e-paper 3609a (in addition, it may also be an e-book, a web page, or the like) including articles 1 to 6.

On the other hand, in the example shown in FIG. 24B, the pattern 3601 is irregularly distorted in the area 3605 (first area) owing to the disposition of the object 3603 on the projection plane 1601. In this case, the projectable area determination part 312 acts differently from the example described in the first example, and cuts out the area 3605 from a projectable area 3607b. The projector controller 313 controls the projector 160 and causes an e-paper 3609b including articles 1 to 5, which has been edited according to the projectable area 3607b, to be displayed. The shape of the e-paper 3609b is changed in a manner that the area of the article 5 does not cover the first area 3605, and the article 6 is omitted instead.

Still further, in the example shown in FIG. 24C, in addition to the fact that the pattern 3601 is irregularly distorted in the area 3605, the projectable area determination part 312 detects that the pattern 3601 is regularly projected in an area 3611 (second area) representing a flat surface of the object 3603. On the basis of this, the projectable area determination part 312 determines a projectable area 3607 including a first projectable area 3607b which does not include the area 3605 and a second projectable area 3607c corresponding to the area 3611. The projector controller 313 controls the projector 160 and causes an e-paper 3609c including articles 1 to 5 and 7, which has been edited according to the projectable area 3607 described above, to be displayed. Here, the e-paper 3609c is obtained by adding the article 7 displayed in the second projectable area 3607c to the e-paper 3609b shown in FIG. 24B.

Third Display Example

Figure 25A:
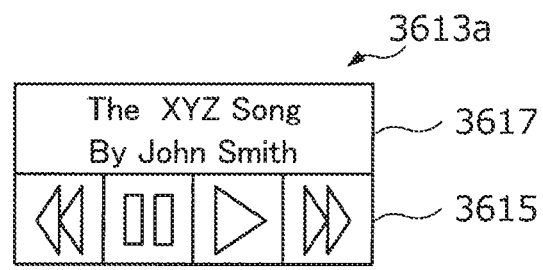
FIG. 25A is a diagram showing a third display example according to the third embodiment of the present disclosure.
Figure 25B:
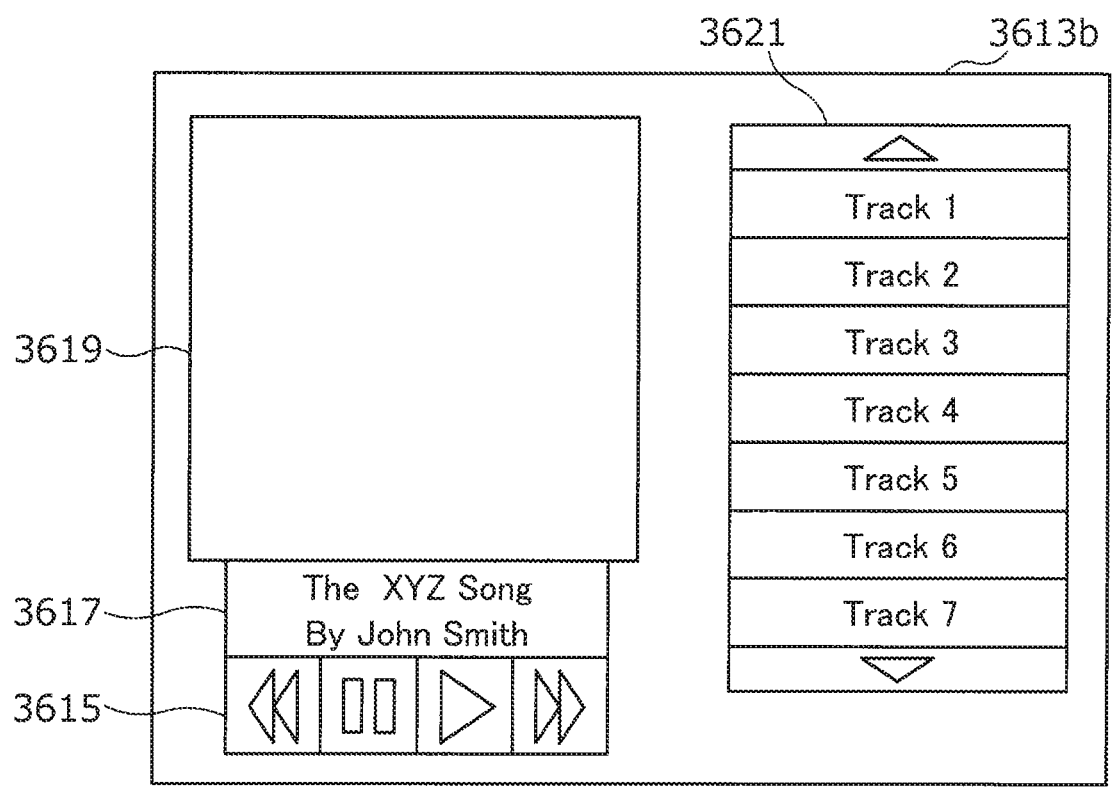
FIG. 25B is a diagram showing the third display example according to the third embodiment of the present disclosure.
Figure 25C:
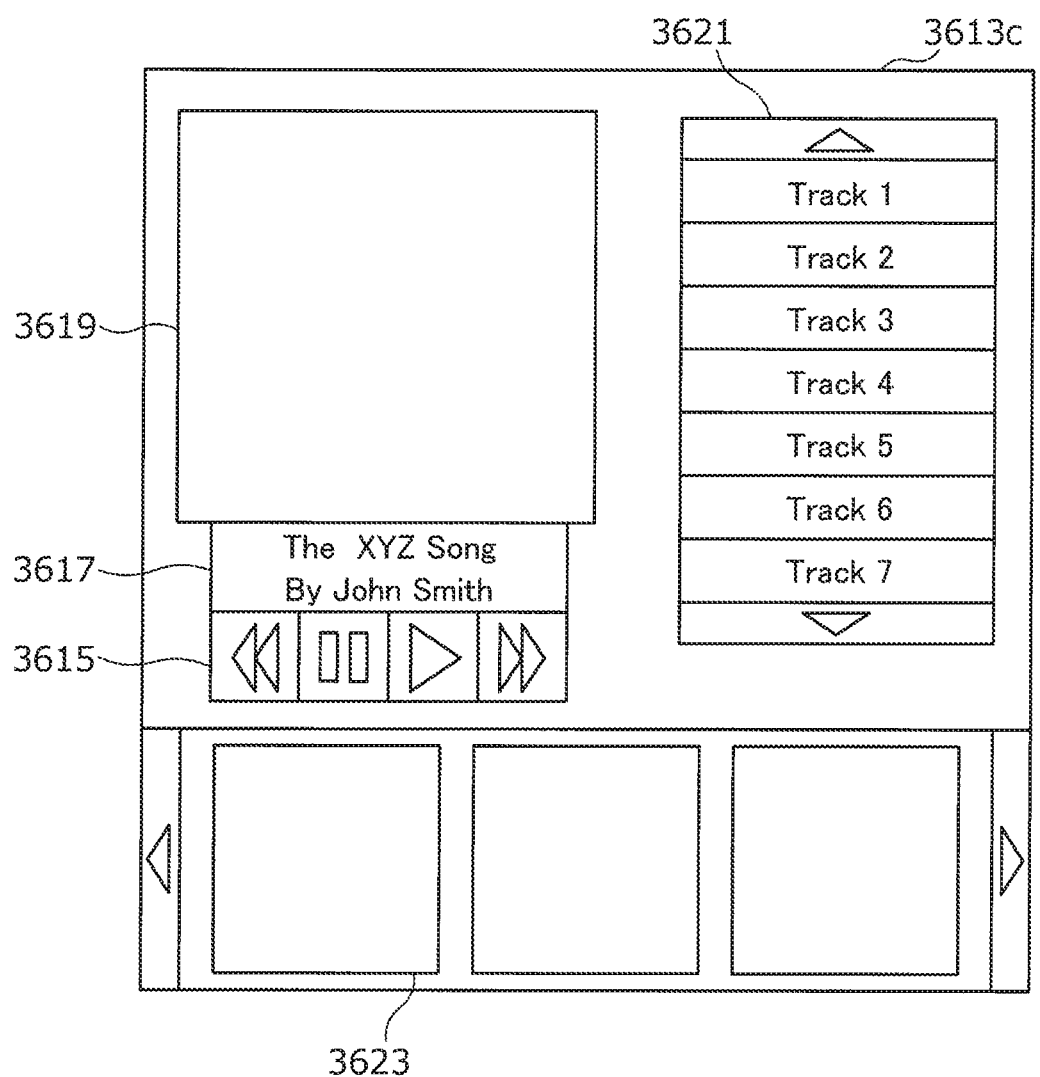
FIG. 25C is a diagram showing the third display example according to the third embodiment of the present disclosure.

FIGS. 25A, 25B, and 25C are each a diagram showing a third display example according to the third embodiment of the present disclosure. FIGS. 25A, 25B, and 25C each show an example in which an amount of information of an image projected by the projector 160 changes in accordance with the size of the pattern in the image captured by the camera module 150. In this example, the projector 160 displays an image of a music player 3613 on the projection plane 1601.

FIG. 25A is an example of the case where the size of the pattern 3601 in the captured image is relatively small. In this case, since it is estimated that the size of the image of a music player 3613a that a user visually recognizes is relatively small, the projector controller 313 allows the image of the music player 3613a to be a simple image including a set of control buttons 3615 (playback, pause, fast-forward, and fast-rewind) and a set of music and artist names 3617.

FIG. 25B is an example of the case where the size of the pattern 3601 in the captured image is medium. In this case, since it is estimated that the size of the image of a music player 3613b that a user visually recognizes is medium, the projector controller 313 allows the image of the music player 3613b to be an image including, in addition to the elements of the music player 3613a shown in FIG. 25A, an image 3619 corresponding to a music being played back and a music list 3621.

FIG. 25C is an example of the case where the size of the pattern 3601 in the captured image is relatively large. In this case, since it is estimated that the size of the image of a music player 3613c that a user visually recognizes is relatively large, the projector controller 313 allows the image of the music player 3613c to be a full image including, in addition to the elements of the music player 3613b shown in FIG. 25B, an image 3623 corresponding to other music pieces stored in a library.

Fourth Display Example

Figure 26:
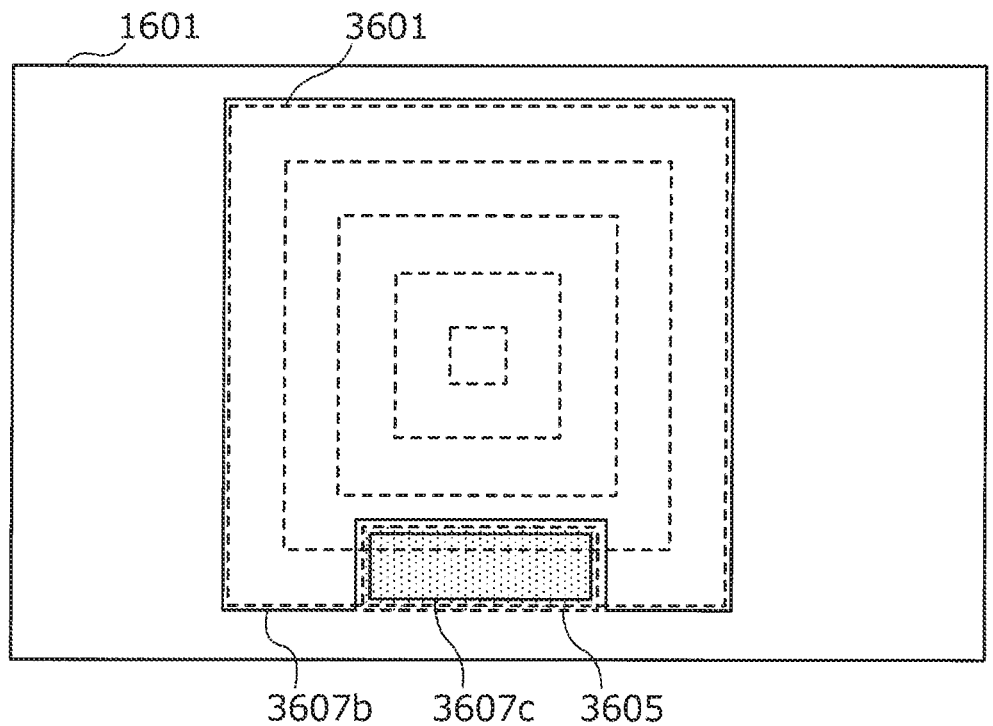
FIG. 26 is a diagram showing a fourth display example according to the third embodiment of the present disclosure.
Figure 26:
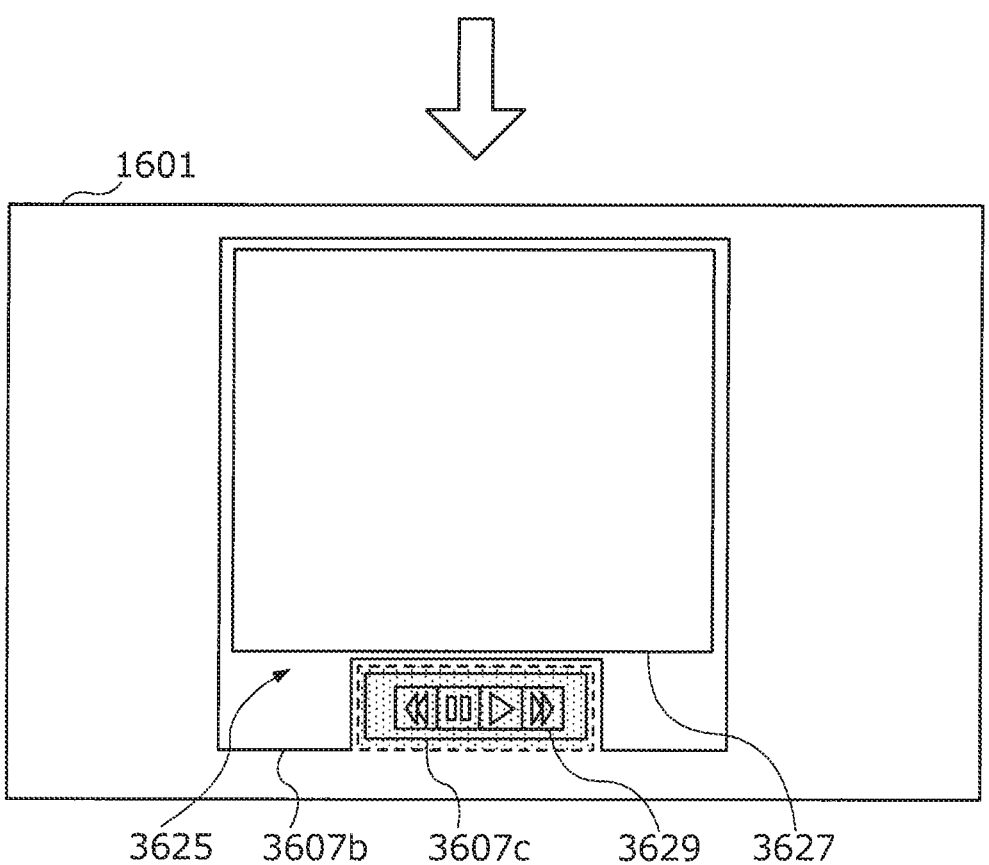

FIG. 26 is a diagram showing a fourth display example according to the third embodiment of the present disclosure. Referring to FIG. 26, the projector 160 projects the pattern 3601 having concentric rectangles on the projection plane 1601. The pattern 3601 is displayed in a manner that a texture is irregularly changed in the area 3605 (first area) owing to a texture-changed part on the projection plane 1601. In such a case, in the system 30, the image acquisition part 311 acquires a captured image including the pattern 3601 which has the texture irregularly changed in the area 3605 from the camera module 150.

In addition, in the example described above, the projectable area determination part 312 detects, in addition to that the texture of the pattern 3601 is irregularly changed in the area 3605, that the texture is regularly changed (or, is not changed) inside the area 3605, and that the projected image can be visually recognized though the visibility thereof is not as high as the visibility in the area 3605. On the basis of this, the projectable area determination part 312 determines the projectable area 3607 including the first projectable area 3607b which does not include the area 3605 and the second projectable area 3607c corresponding to the area 3605.

Here, in the example shown in the figure, an image of a video player 3625 includes a content image 3627 and a control button 3629, the image of the video player 3625 being displayed by the projector controller 313 by controlling the projector 160. The projector controller 313 disposes the content image 3627 in the first projectable area 3607b, and the control button 3629 in the second projectable area 3607c. In this way, the content image 3627 is displayed in the projectable area 3607b in which the visibility of the projected image is higher, and the control button 3629 is disposed in the second projectable area 3607c in which the visibility is slightly low but icons are sufficiently visually recognizable. Thus, the entire projectable area 3607 is fully used, and the content image 3627 can be displayed in a larger size.

Applying the examples described above, a user can control contents of a projected image by intentionally disposing an object on the projection plane 1601. For example, in the case where an image of an application for accepting text input such as an e-mail is projected on the projection plane 1601 placed on a table, the user can dispose, on the projection plane 1601, paper having a texture (color, pattern, or the like) that is different from the texture of the table, and thus can display an on-screen keyboard or the like on the paper.

Note that, in the figures and descriptions of the present embodiment, the pattern having concentric rectangles is shown as an example of the pattern 3601, but the embodiments of the present disclosure are not limited to such an example. The pattern 3601 may be any as long as the pattern 3601 has a figure that the change in the shape and/or texture is detectable, and the size of which can be measured as necessary depending on the interval of the figures or the like. As an example, the pattern 3601 may have a lattice-like structure, concentric circles, concentric polygons other than rectangles, or the like. Further, for example, in the case where it is detected that the object 3603 is removed from the state shown in the FIG. 24B, redrawing may be executed in the form that the article 6 is not omitted, as shown in FIG. 24A.

4. Hardware Configuration

Finally, with reference to FIG. 27, a more specific hardware configuration example of an information processing apparatus according to an embodiment of the present disclosure will be described. FIG. 27 is a block diagram showing a hardware configuration example of an information processing apparatus according to an embodiment of the present disclosure. A single information processing apparatus 900 shown in the figure or a combination of the information processing apparatuses 900 achieves a system according to the embodiments described above, for example.

The information processing apparatus 900 includes a central processing unit (CPU) 901, read only memory (ROM) 903, and random access memory (RAM) 905. Further, the information processing apparatus 900 may also include a host bus 907, a bridge 909, an external bus 911, an interface 913, an input device 915, an output device 917, a storage device 919, a drive 921, a connection port 923, and a communication device 925. The information processing apparatus 900 may also include, instead of or along with the CPU 901, a processing circuit such as a digital signal processor (DSP) or an application specific integrated circuit (ASIC).

The CPU 901 functions as an arithmetic processing unit and a control unit and controls an entire operation or a part of the operation of the information processing apparatus 900 according to various programs recorded in the ROM 903, the RAM 905, the storage device 919, or a removable recording medium 927. The ROM 903 stores programs and arithmetic parameters used by the CPU 901. The RAM 905 primarily stores programs used in execution of the CPU 901 and parameters and the like at the execution. The CPU 901, the ROM 903, and the RAM 905 are connected to each other via the host bus 907 configured from an internal bus such as a CPU bus or the like. In addition, the host bus 907 is connected to the external bus 911 such as a peripheral component interconnect/interface (PCI) bus via the bridge 909.

The input device 915 is a device operated by a user, such as a mouse, a keyboard, a touch panel, buttons, or a switch. Also, the input device 915 may be a remote control device using, for example, infrared rays or other radio waves, or may be an external connection device 929 such as a mobile phone compatible with the operation of the information processing apparatus 900. The input device 915 includes an input control circuit that generates an input signal on the basis of information input by the user and outputs the input signal to the CPU 901. The user inputs various kinds of data to the information processing apparatus 900 and instructs the information processing apparatus 900 to perform a processing operation by operating the input device 915.

The output device 917 is configured from a device capable of visually or aurally notifying the user of acquired information. For example, the output device 917 may be: a display device such as a liquid crystal display (LCD), or an organic electro-luminescence (EL) display; or an audio output device such as a speaker and headphones. The output device 917 outputs results obtained by the processing performed by the information processing apparatus 900 as video in the form of text or an image or as audio in the form of audio or sound.

The storage device 919 is a device for storing data configured as an example of a storage of the information processing apparatus 900. The storage device 919 is configured from, for example, a magnetic storage device such as a hard disk drive (HDD), a semiconductor storage device, an optical storage device, or a magneto-optical storage device. This storage device 919 stores programs to be executed by the CPU 901, various data, and various data obtained from the outside.

The drive 921 is a reader/writer for the removable recording medium 927 such as a magnetic disk, an optical disc, a magneto-optical disk, or a semiconductor memory, and is built in or externally attached to the information processing apparatus 900. The drive 921 reads out information recorded on the attached removable recording medium 927, and outputs the information to the RAM 905. Further, the drive 921 writes the record on the attached removable recording medium 927.

The connection port 923 is a port for allowing devices to directly connect to the information processing apparatus 900. Examples of the connection port 923 include a universal serial bus (USB) port, an IEEE1394 port, and a small computer system interface (SCSI) port. Other examples of the connection port 923 may include an RS-232C port, an optical audio terminal, and a high-definition multimedia interface (HDMI) port. The connection of the external connection device 929 to the connection port 923 may enable the various data exchange between the information processing apparatus 900 and the external connection device 929.

The communication device 925 is a communication interface configured from, for example, a communication device for establishing a connection to a communication network 931. The communication device 925 is, for example, a wired or wireless local area network (LAN), Bluetooth (registered trademark), a communication card for wireless USB (WUSB), or the like. Alternatively, the communication device 925 may be a router for optical communication, a router for asymmetric digital subscriber line (ADSL), a modem for various communications, or the like. The communication device 925 can transmit and receive signals and the like using a predetermined protocol such as TCP/IP on the Internet and with other communication devices, for example. The communication network 931 connected to the communication device 925 is configured from a network and the like, which is connected via wire or wirelessly, and is, for example, the Internet, a home-use LAN, infrared communication, radio wave communication, and satellite communication.

Heretofore, an example of the hardware configuration of the information processing apparatus 900 has been shown. Each of the structural elements described above may be configured using a general-purpose material, or may be configured from hardware dedicated to the function of each structural element. The configuration may be changed as appropriate according to the technical level at the time of carrying out embodiments.

5. Supplement

The embodiments of the present disclosure may include the information processing apparatus, the system, the information processing method executed in the information processing apparatus or the system, the program for causing the information processing apparatus to function, and the non-transitory tangible media having the program recorded thereon, which have been described above, for example.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An information processing apparatus including:

a display controller configured to cause a first icon to be displayed;

an operation acquisition part configured to acquire a user operation for moving the first icon in a first area within a display surface;

an area detector configured to detect an overlapping area in which the first area overlaps with a second area, the second area being present within the display surface and being different from the first area; and a metadata sharing processing part configured to share, between the first icon which is moved from the first area to the overlapping area and a second icon which is different from the first icon and is moved from the second area to the overlapping area, pieces of metadata associated with pieces of content corresponding to the respective icons.

(2) The information processing apparatus according to (1), wherein, after the overlapping of the first area and the second area has been cancelled, the display controller causes the overlapping area to be virtually displayed.

(3) The information processing apparatus according to (2), wherein the display controller causes a virtual overlapping area to be displayed separately from the overlapping area in which the first area overlaps with a plurality of the second areas, the virtual overlapping area being an area in which the first area overlaps with a part of the plurality of second areas.

(4) The information processing apparatus according to (2) or (3), wherein the display controller causes the overlapping area to be displayed in a minimized state.

(5) The information processing apparatus according to any one of (2) to (4),
wherein the operation acquisition part acquires a user operation for changing a size of the overlapping area.

(6) The information processing apparatus according to any one of (2) to (5),
wherein, after the first area has overlapped with a plurality of the second areas sequentially, the display controller causes a plurality of the overlapping areas corresponding to the respective second areas to be virtually displayed.

(7) The information processing apparatus according to any one of (2) to (6),
wherein the operation acquisition part acquires a user operation for generating a new overlapping area by further overlapping a plurality of the overlapping areas.

(8) The information processing apparatus according to any one of (1) to (7),
wherein, in a case where images included in the pieces of content are similar to each other, the metadata sharing processing part shares the pieces of metadata between the pieces of content.

(9) The information processing apparatus according to any one of (1) to (7),
wherein, in a case where one or more items included in the pieces of metadata are common, the metadata sharing processing part shares an item or items other than the one or more items of the pieces of metadata between the pieces of content.

(10) The information processing apparatus according to any one of (1) to (9),
wherein the display controller causes a classification axis corresponding to an item included in the pieces of metadata to be displayed in the overlapping area, and arranges the first icon disposed in the first area or the overlapping area in accordance with the classification axis.

(11) The information processing apparatus according to any one of (1) to (10),
wherein the display controller controls a first projector and causes the first icon and the first area to be projected on a projection plane, and
wherein the area detector detects the overlapping area on the basis of overlapping of projections between the second area and the first area, the second area being projected on the projection plane by a second projector, the second projector being different from the first projector.

(12) The information processing apparatus according to (11),
wherein the display controller further controls a display and causes the projected first icon and the projected first area to be displayed on a screen, and
wherein the operation acquisition part acquires a user operation on the first icon displayed on the display.

(13) The information processing apparatus according to any one of (1) to (10),
wherein the display controller controls a display and causes the first icon, the first area, and the second area to be displayed on a screen, and
wherein the area detector detects the overlapping area on the basis of pieces of virtual position information within the screen of the respective first and second areas.

(14) The information processing apparatus according to (13),
wherein the display controller causes the second icon disposed in the second area or the overlapping area to be displayed on the screen and changes a direction of the second icon so as to be consistent with a direction of the first icon.

(15) An information processing method performed by a processor included in an information processing apparatus, the method including:
causing a first icon to be displayed;
acquiring a user operation for moving the first icon in a first area within a display surface;
detecting an overlapping area in which the first area overlaps with a second area, the second area being present within the display surface and being different from the first area; and
sharing, between the first icon which is moved from the first area to the overlapping area and a second icon which is different from the first icon and is moved from the second area to the overlapping area, pieces of metadata associated with pieces of content corresponding to the respective icons.

(16) A program for causing a computer to achieve:
a function of causing a first icon to be displayed;
a function of acquiring a user operation for moving the first icon in a first area within a display surface;
a function of detecting an overlapping area in which the first area overlaps with a second area, the second area being present within the display surface and being different from the first area; and
a function of sharing, between the first icon which is moved from the first area to the overlapping area and a second icon which is different from the first icon and is moved from the second area to the overlapping area, pieces of metadata associated with pieces of content corresponding to the respective icons.

What is claimed is:
1. An information processing apparatus, comprising:
at least one processor configured to:
control a first projector to project a first icon in a first area on a projection plane, wherein
the projection plane is in a display screen,
the first icon corresponds to first content, and
the first content includes an image;
control a second projector to project a second area on the projection plane, wherein the second projector is different from the first projector;
detect an overlapping area in which the first area overlaps with the second area based on overlap of projections between the second area and the first area, wherein the overlapping area includes the first icon; and
overwrite first information, associated with the first content, with second information associated with second content corresponding to a second icon, wherein
the first information is first metadata of the first content,
the first information associated with the first content is different from the image in the first content,
the second information is second metadata of the second content,
each of the first metadata and the second metadata includes shooting time information, shooting location information, and tag information, and
the first information is overwritten with the second information based on the detected overlapping area,
a plurality of information items common to the first information and the second information, and
similarity between the image in the first content and an image in the second content corresponding to the second icon.

2. The information processing apparatus according to claim 1, wherein the at least one processor is further configured to
control the second projector to project the second icon in the second area on the projection plane.

3. The information processing apparatus according to claim 1, wherein the at least one processor is further configured to:
control the display screen to display the overlapping area as a virtual overlapping area based on cancellation of the overlap of the first area and the second area; and
control the display screen to display the overlapping area in a minimized state.

4. The information processing apparatus according to claim 1, wherein the at least one processor is further configured to control the display screen to display the first icon, in the overlapping area, in a direction that is opposite to the first area on the projection plane.

5. The information processing apparatus according to claim 1, wherein the at least one processor is further configured to acquire an input that corresponds to a movement of each of the first area and the second area within the display screen.

6. The information processing apparatus according to claim 5, wherein the at least one processor is further configured to determine the overlapping area based on the acquired input.

7. The information processing apparatus according to claim 6, wherein the movement of each of the first area and the second area is associated with a position and an angle of projection of each of the first projector and the second projector.

8. The information processing apparatus according to claim 1, wherein the at least one processor is further configured to:
detect a plurality of overlapping areas on the display screen, wherein the plurality of overlapping areas includes the overlapping area; and
control the display screen to display each of the plurality of overlapping areas in a different color.

9. The information processing apparatus according to claim 1, wherein the at least one processor is further configured to:
control the display screen to display a classification axis that corresponds to one of position information of the first icon or the tag information of the first icon; and
arrange the first icon in one of the first area or the overlapping area based on the classification axis.

10. An information processing method, comprising:
in an information processing apparatus:
controlling a first projector to project a first icon in a first area on a projection plane, wherein
the projection plane is in a display screen,
the first icon corresponds to first content, and
the first content includes an image;
controlling a second projector to project a second area on the projection plane, wherein the second projector is different from the first projector;
detecting an overlapping area in which the first area overlaps with the second area based on overlap of projections between the second area and the first area, wherein the overlapping area includes the first icon; and
overwriting first information, associated with the first content, with second information associated with second content corresponding to a second icon, wherein
the first information is first metadata of the first content,
the first information associated with the first content is different from the image in the first content,
the second information is second metadata of the second content,
each of the first metadata and the second metadata includes shooting time information, shooting location information, and tag information, and
the first information is overwritten with the second information based on the detected overlapping area,
a plurality of information items common to the first information and the second information, and
similarity between the image in the first content and an image in the second content corresponding to the second icon.

11. A non-transitory computer-readable medium having stored thereon computer-readable instructions, which when executed by a processor, cause the processor to execute operations, the operations comprising:
controlling a first projector to project a first icon in a first area on a projection plane, wherein
the projection plane is in a display screen,
the first icon corresponds to first content, and
the first content includes an image;
controlling a second projector to project a second area on the projection plane, wherein the second projector is different from the first projector;
detecting an overlapping area in which the first area overlaps with the second area based on overlap of projections between the second area and the first area, wherein the overlapping area includes the first icon; and
overwriting first information, associated with the first content, with second information associated with second content corresponding to a second icon, wherein
the first information is first metadata of the first content,
the first information associated with the first content is different from the image in the first content,
the second information is second metadata of the second content,
each of the first metadata and the second metadata includes shooting time information, shooting location information, and tag information, and
the first information is overwritten with the second information based on the detected overlapping area,
a plurality of information items common to the first information and the second information, and
similarity between the image in the first content and an image in the second content corresponding to the second icon.

* * * * *